US006542746B1

(12) United States Patent
Dean

(10) Patent No.: US 6,542,746 B1
(45) Date of Patent: Apr. 1, 2003

(54) FREQUENCY REUSE SCHEME FOR POINT TO MULTIPOINT RADIO COMMUNICATION

(75) Inventor: Stuart Dean, Kemptville (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/411,294

(22) Filed: Oct. 4, 1999

Related U.S. Application Data

(60) Provisional application No. 60/103,611, filed on Oct. 9, 1998.

(51) Int. Cl.$^7$ ............................ H04Q 7/20; H04M 1/00
(52) U.S. Cl. ........................................ 455/447; 455/562
(58) Field of Search ................................ 455/562, 446, 455/447, 422, 403, 561; 370/329, 330, 331, 332

(56) References Cited

U.S. PATENT DOCUMENTS

| | | | | | |
|---|---|---|---|---|---|
| 3,898,662 | A | * | 8/1975 | Hom et al. .................... 342/15 |
| 4,249,181 | A | * | 2/1981 | Lee .............................. 342/367 |
| 4,275,397 | A | * | 6/1981 | Gutleber ....................... 343/100 |
| 4,431,999 | A | | 2/1984 | Gutleber |
| 5,602,555 | A | * | 2/1997 | Searle et al. ................. 342/154 |
| 5,771,017 | A | * | 6/1998 | Dean et al. .................. 342/374 |
| 5,832,389 | A | * | 11/1998 | Dent .................... 343/700 MS |
| 5,903,826 | A | * | 5/1999 | Nowak ......................... 342/367 |
| 6,038,459 | A | * | 3/2000 | Searle et al. ................. 455/507 |
| 6,047,186 | A | * | 4/2000 | Yu et al. ....................... 455/446 |
| 6,104,936 | A | * | 8/2000 | Kronestedt ................... 342/359 |
| 6,111,538 | A | * | 8/2000 | Schuchman et al. ......... 342/357 |
| 6,304,762 | B1 | * | 10/2001 | Myers et al. ................. 455/422 |
| 6,311,075 | B1 | * | 10/2001 | Bevan et al. ................. 342/368 |
| 6,314,304 | B1 | * | 11/2001 | Uesugi ......................... 455/517 |
| 6,366,254 | B1 | * | 4/2002 | Sievenpiper et al. ......... 343/770 |
| 6,370,384 | B1 | * | 4/2002 | Komara ......................... 455/15 |
| 6,418,316 | B2 | * | 7/2002 | Hildebrand et al. ......... 370/203 |

FOREIGN PATENT DOCUMENTS

EP   0 994 632 A2   4/2000

OTHER PUBLICATIONS

"Spectral Efficiency Improvement by Base Station Antenna Pattern Control for Land Mobile Cellular Systems", 2334b, IEICE Transactions on Communications, pp. 598–605, vol. E77–B (1994) May, 5, Tokyo, JP.

* cited by examiner

Primary Examiner—Nguyen T. Vo
Assistant Examiner—Edan Orgad
(74) Attorney, Agent, or Firm—Gibbons, Del Deo, Dolan, Griffinger & Vecchione

(57) ABSTRACT

The invention provides frequency reuse techniques to enable fractional frequency reuse to be achieved for various cellular radio deployment grids, even for high order modulation such as 16 QAM and 64 QAM by the use of controlled and coordinated notched antenna patterns. The technique allows all frequencies to be used in all cells, thus maximizing system capacity while minimizing and controlling adjacent cell interference by the use of notched antenna patterns.

26 Claims, 31 Drawing Sheets

(Channel 2)

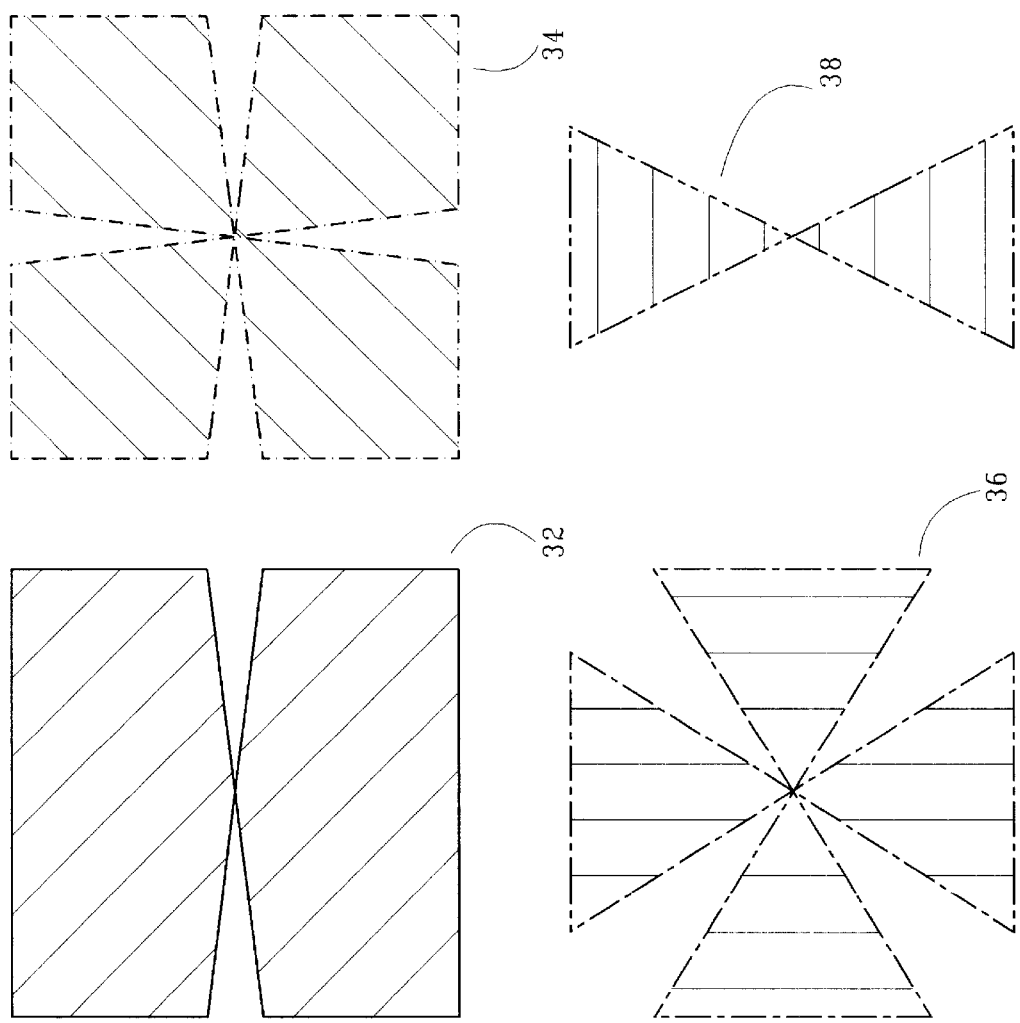

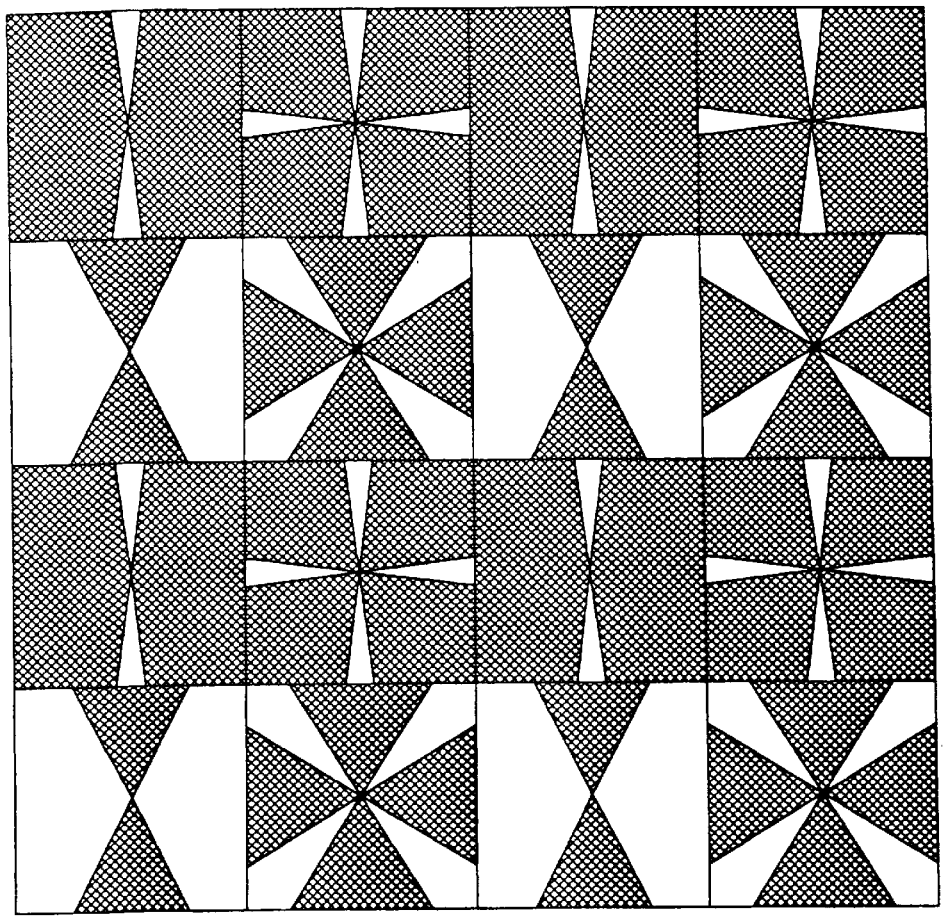
Fig. 5A    (Channel 1)

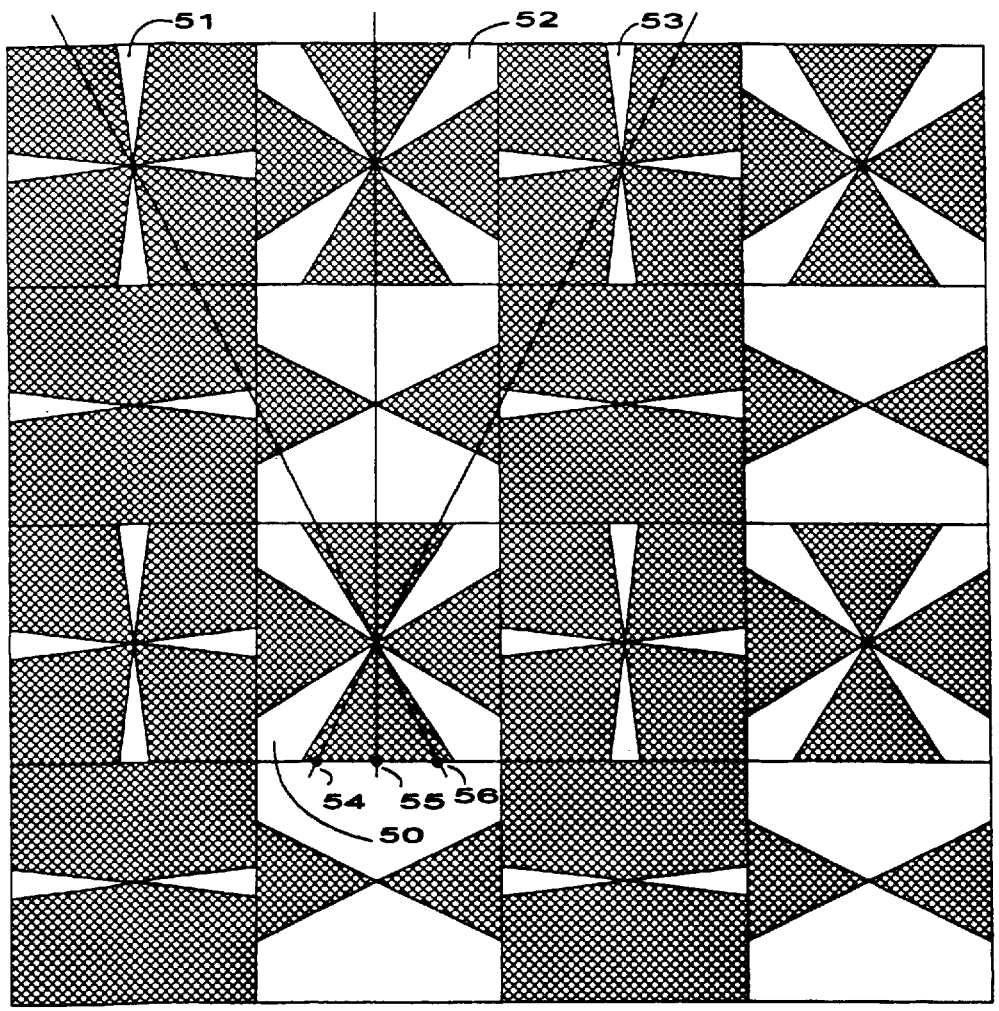
Fig. 5B (Channel 2)

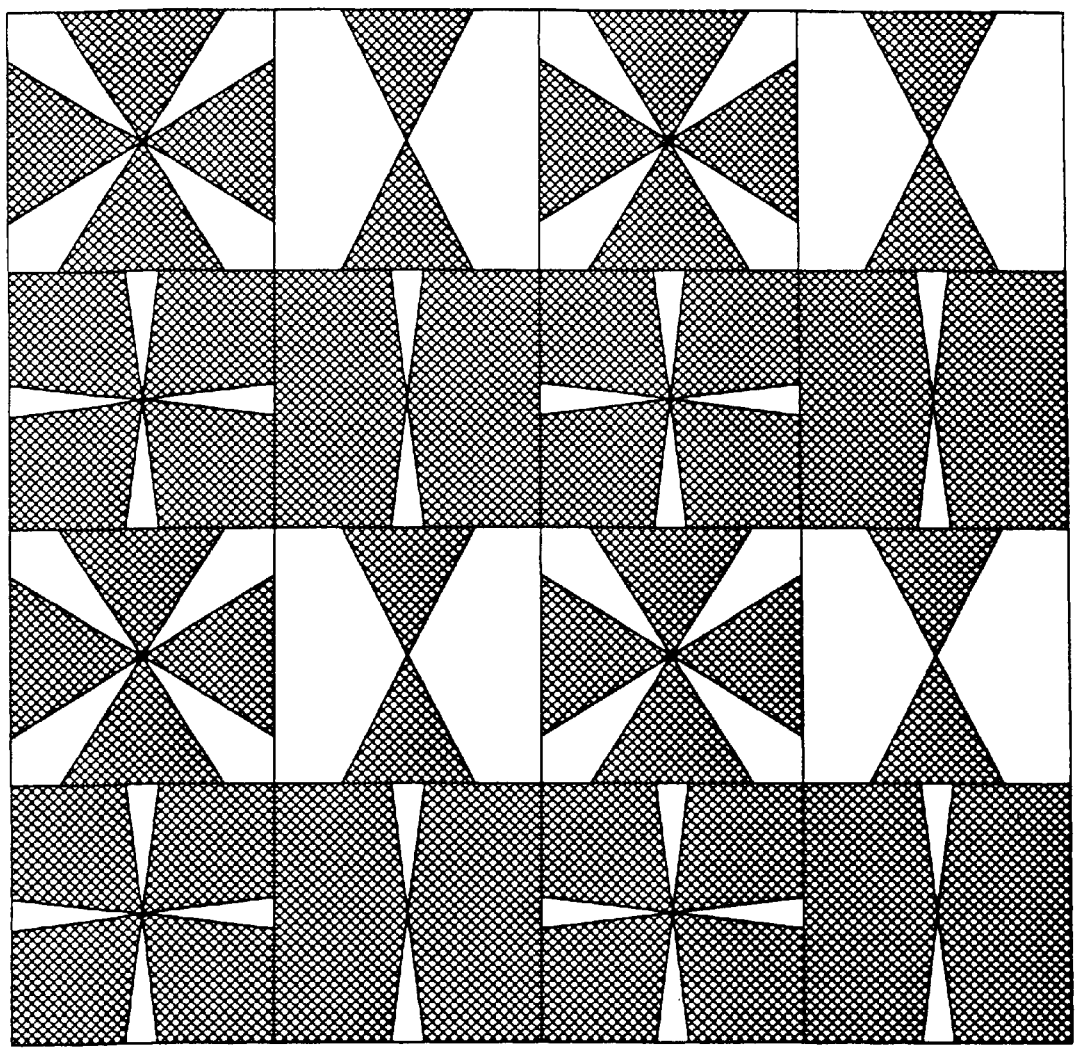
Fig. 5C  (Channel 3)

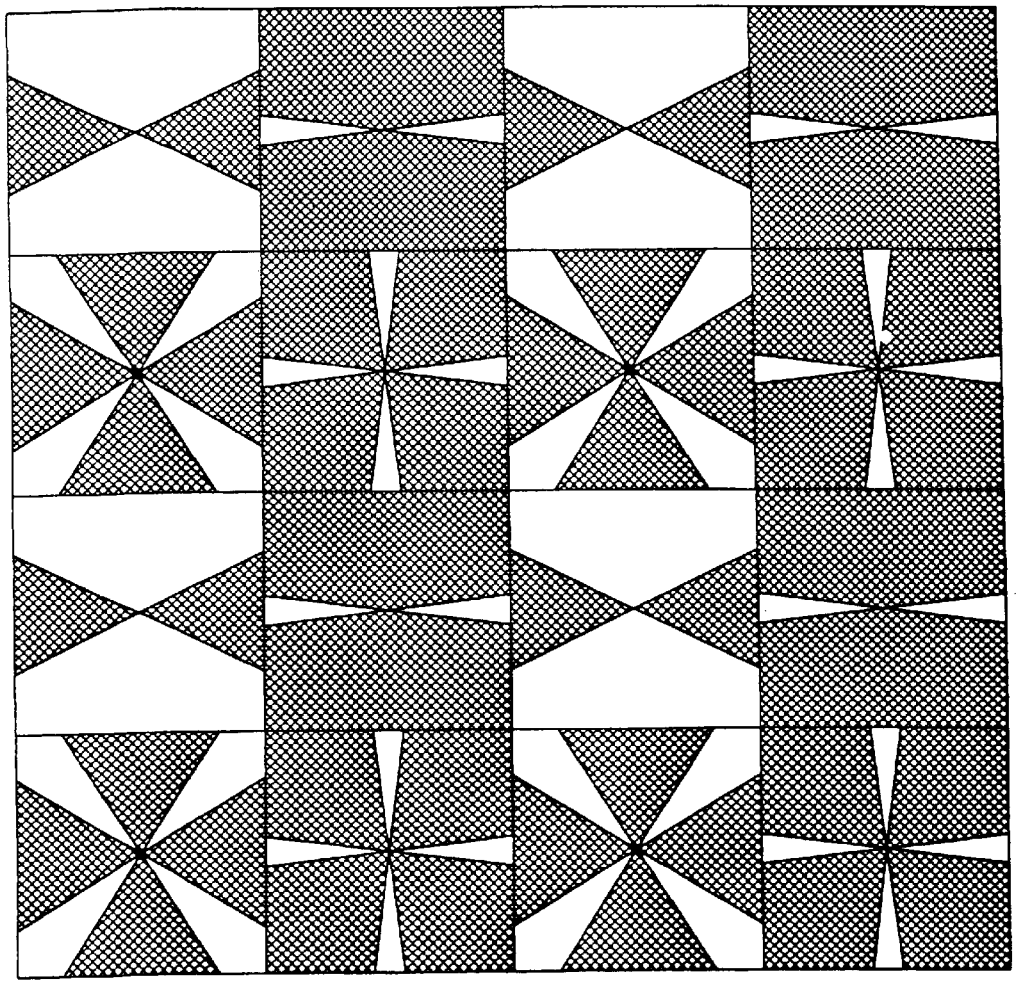
Fig. 5D (Channel 4)

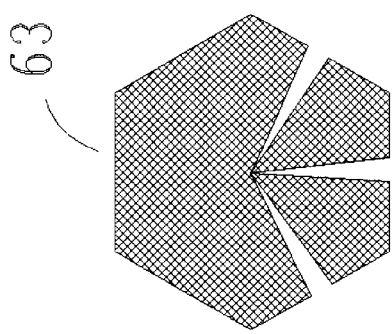
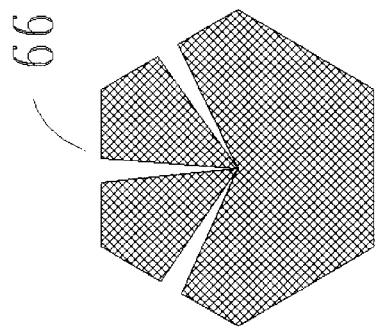
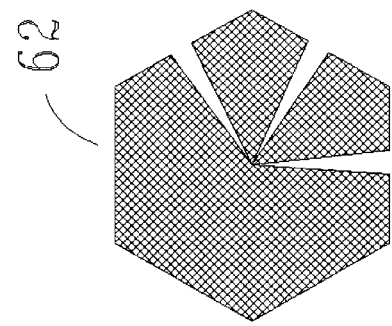
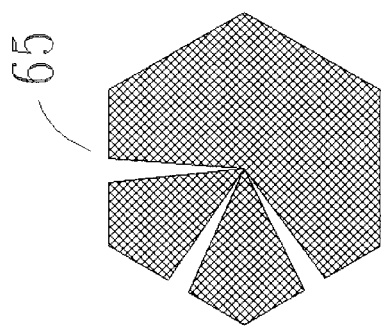
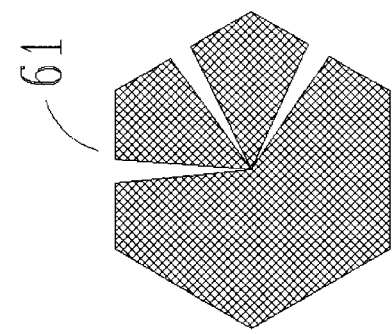
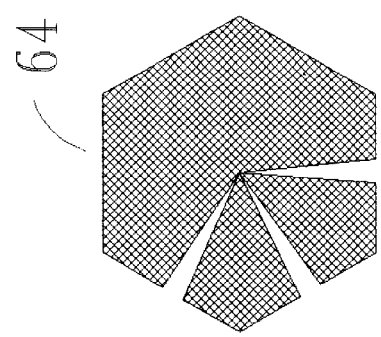
Fig. 6

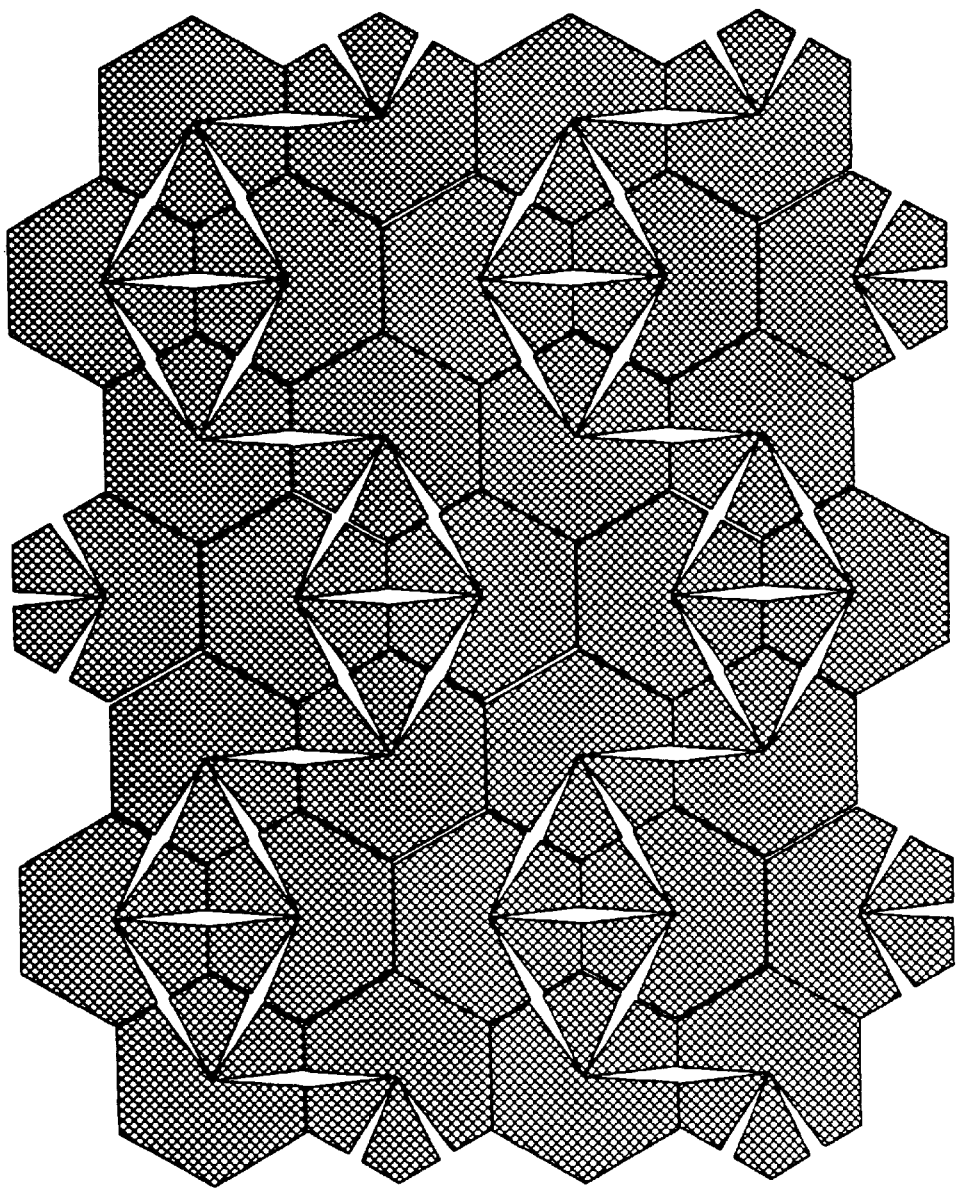
Fig. 7A (Channel 1)

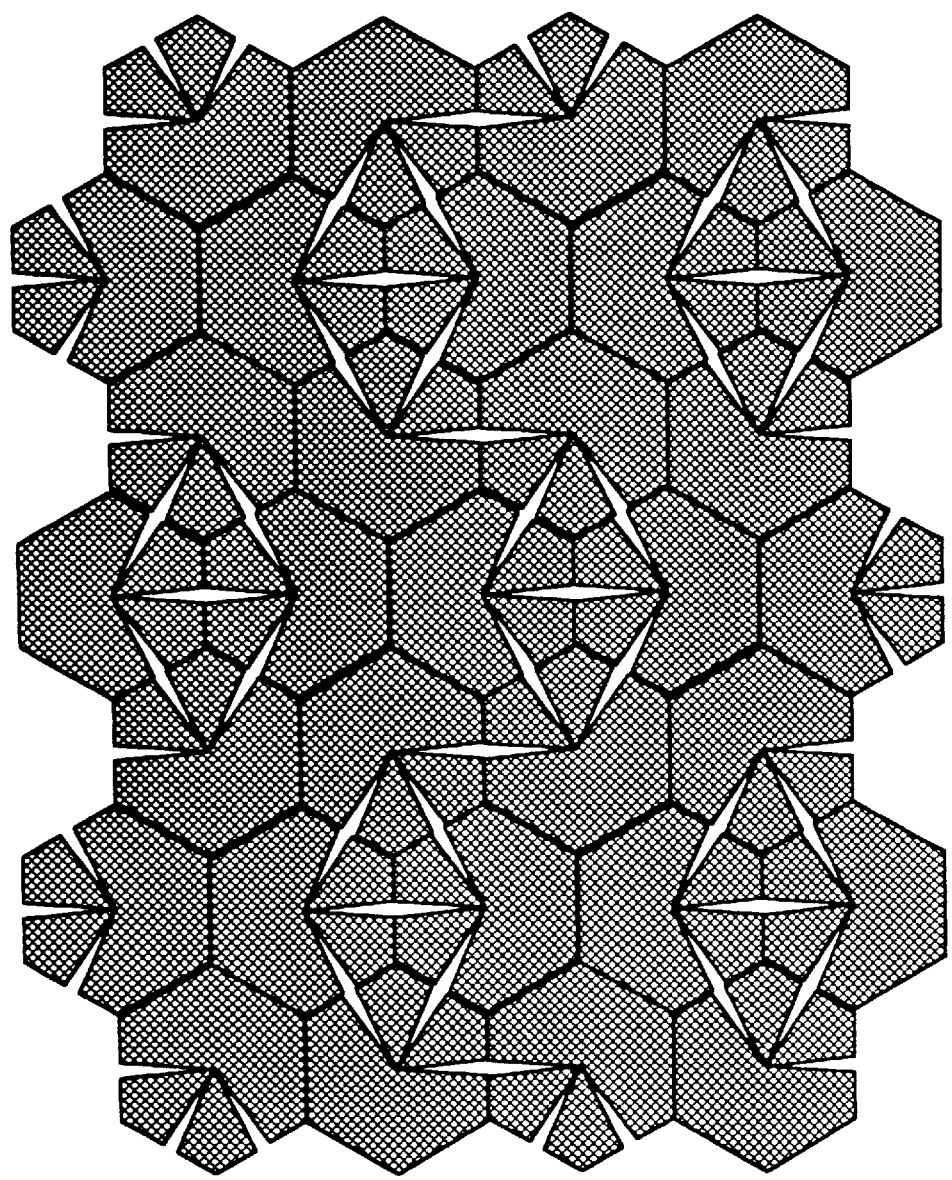
Fig. 7B (Channel 2)

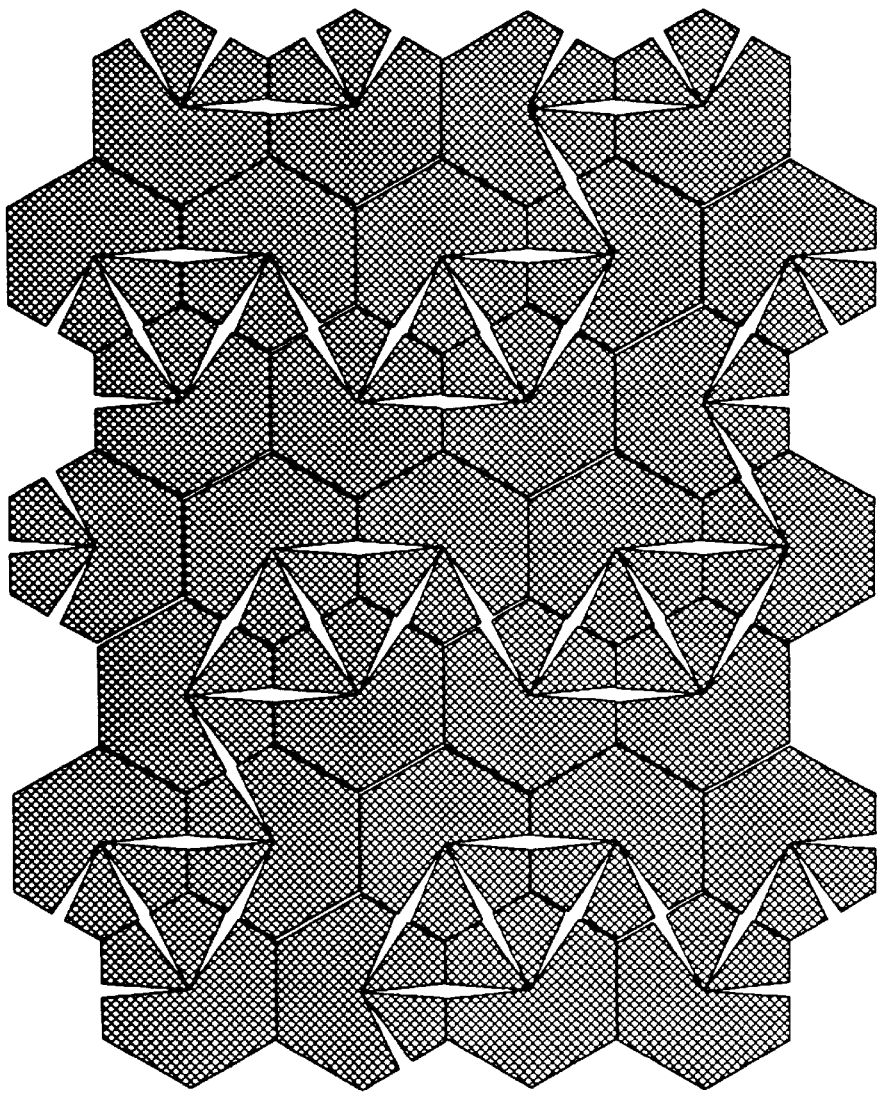
Fig. 7C (Channel 3)

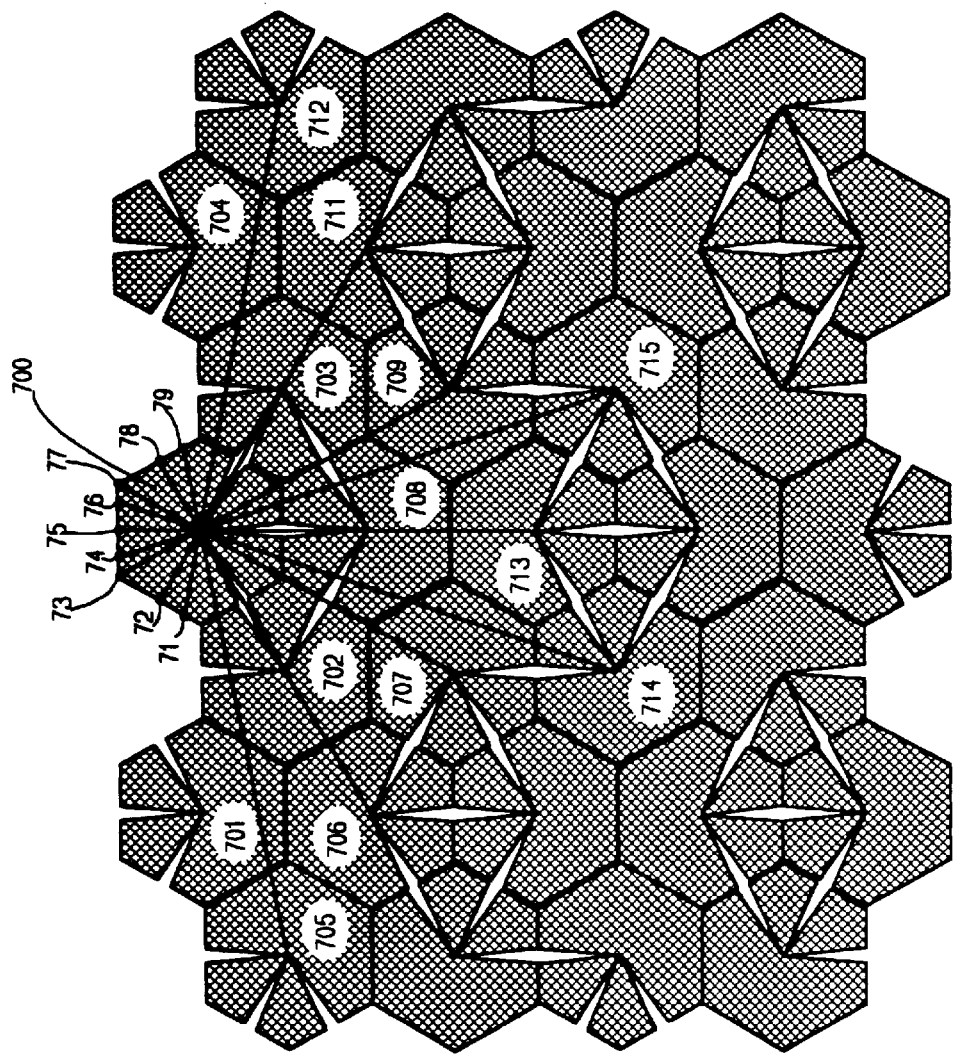
Fig. 7D (Channel 2)

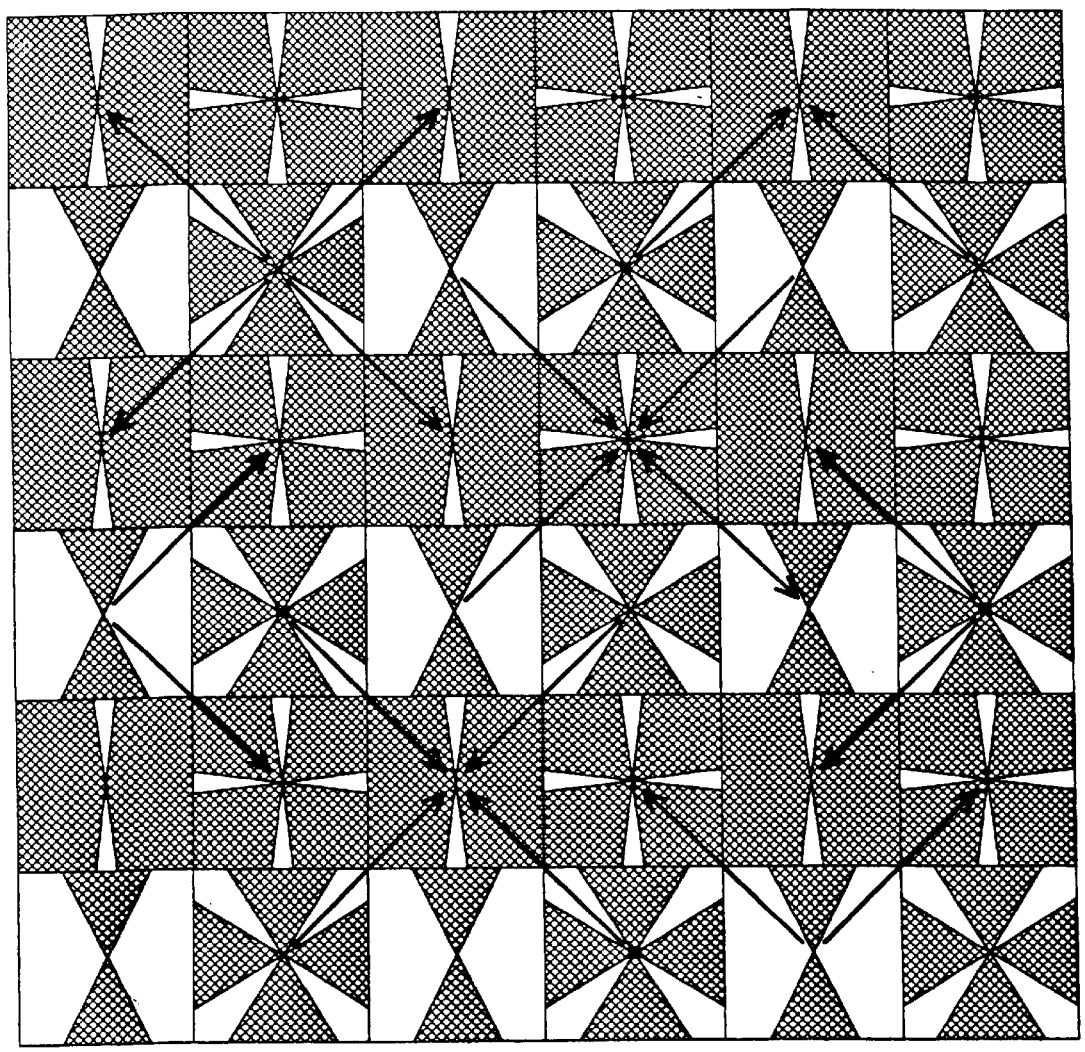
Fig. 8A        (Channel 1)

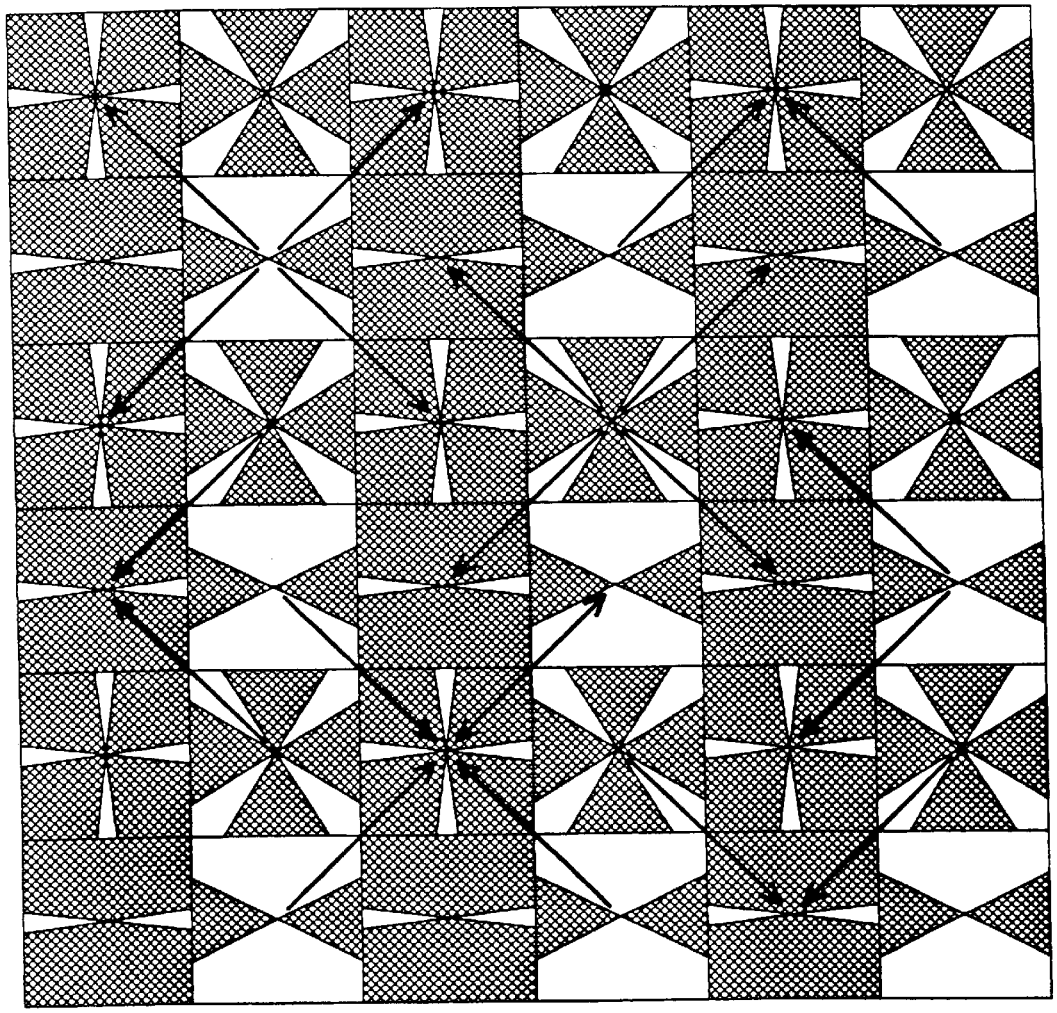
Fig. 8B  (Channel 2)

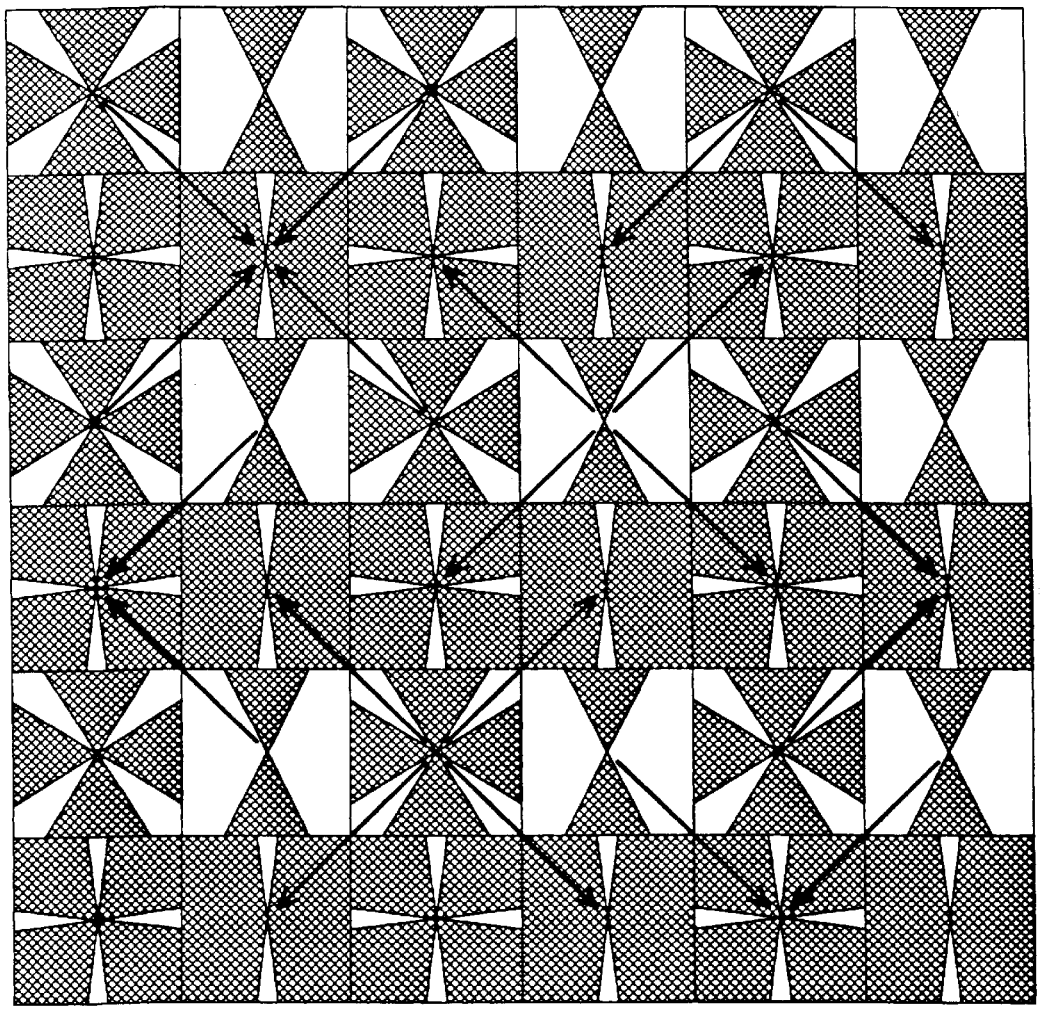
Fig. 8C  (Channel 3)

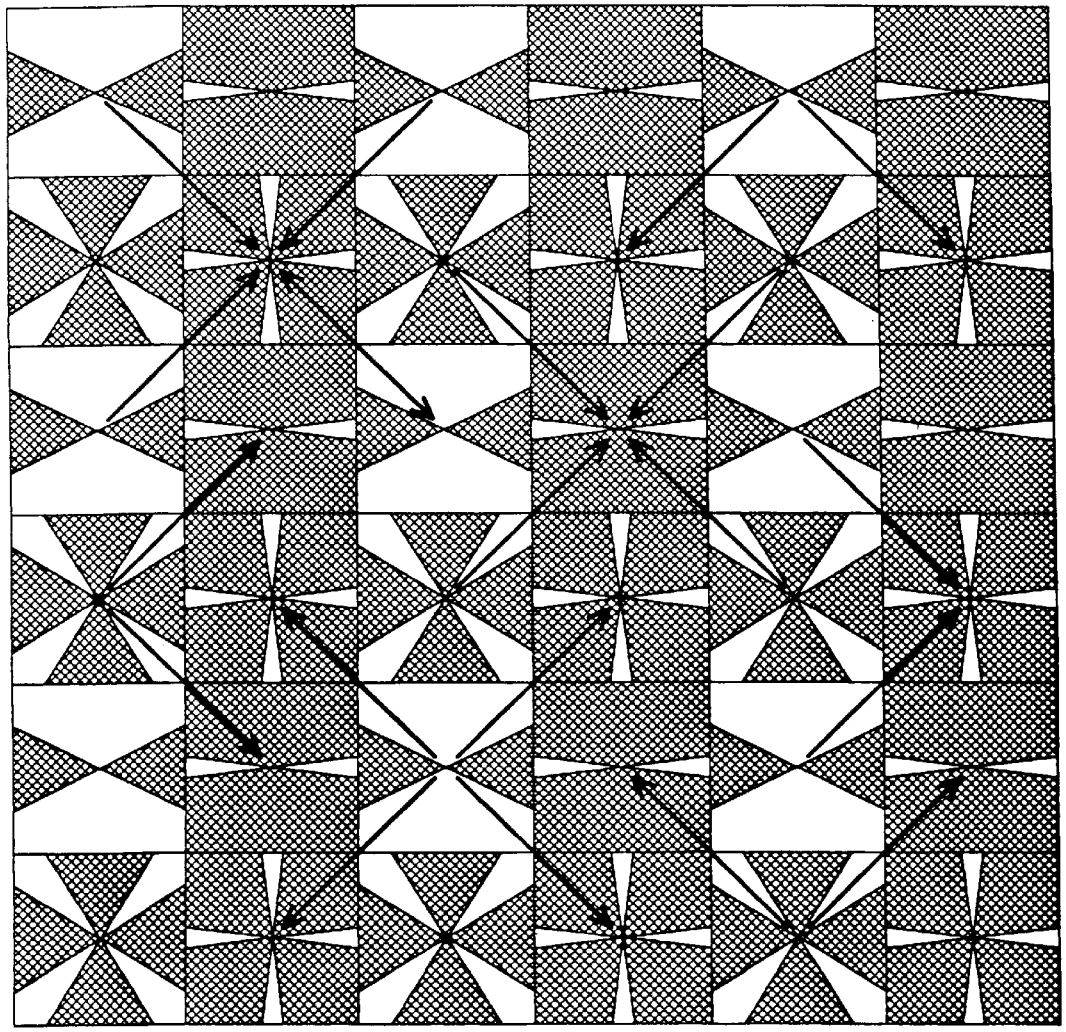
Fig. 8D          (Channel 4)

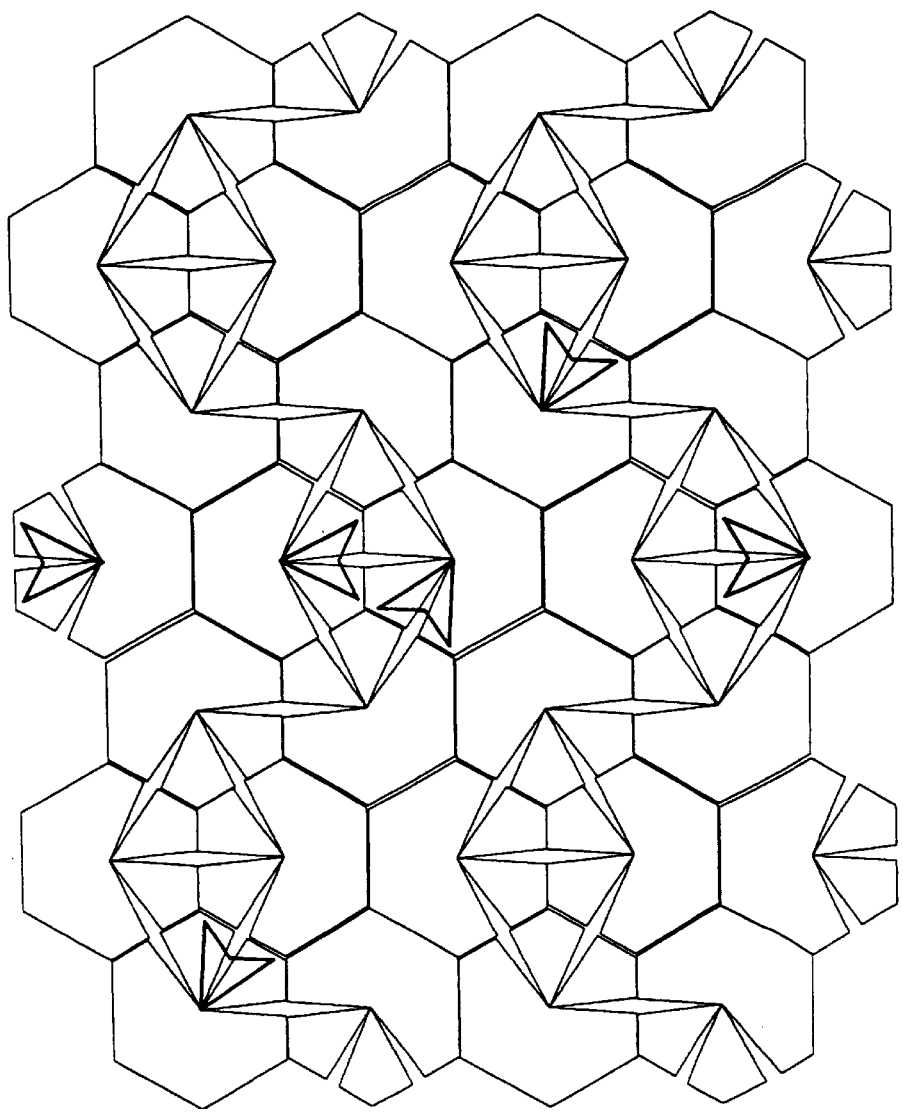
Fig. 9A (Channel 1)

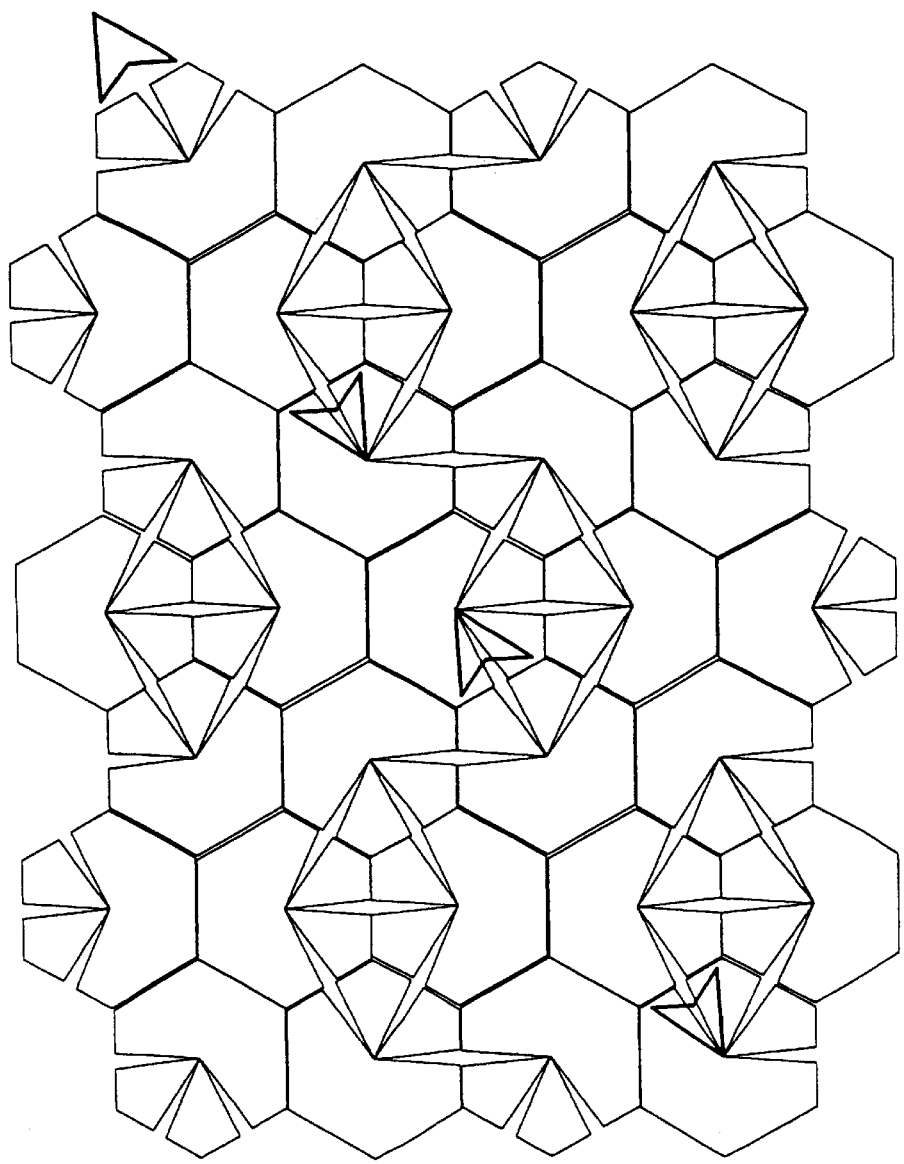
Fig. 9B (Channel 2)

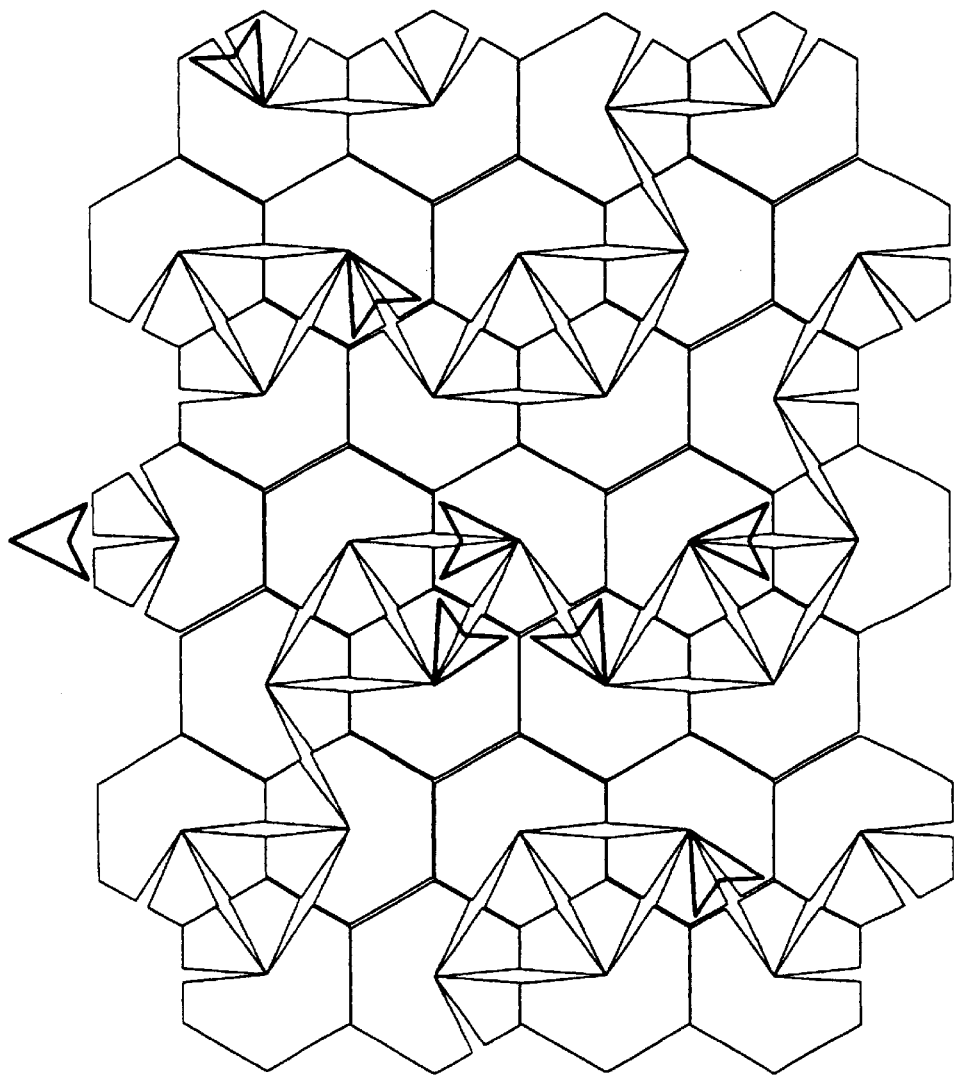
Fig. 9C (Channel 3)

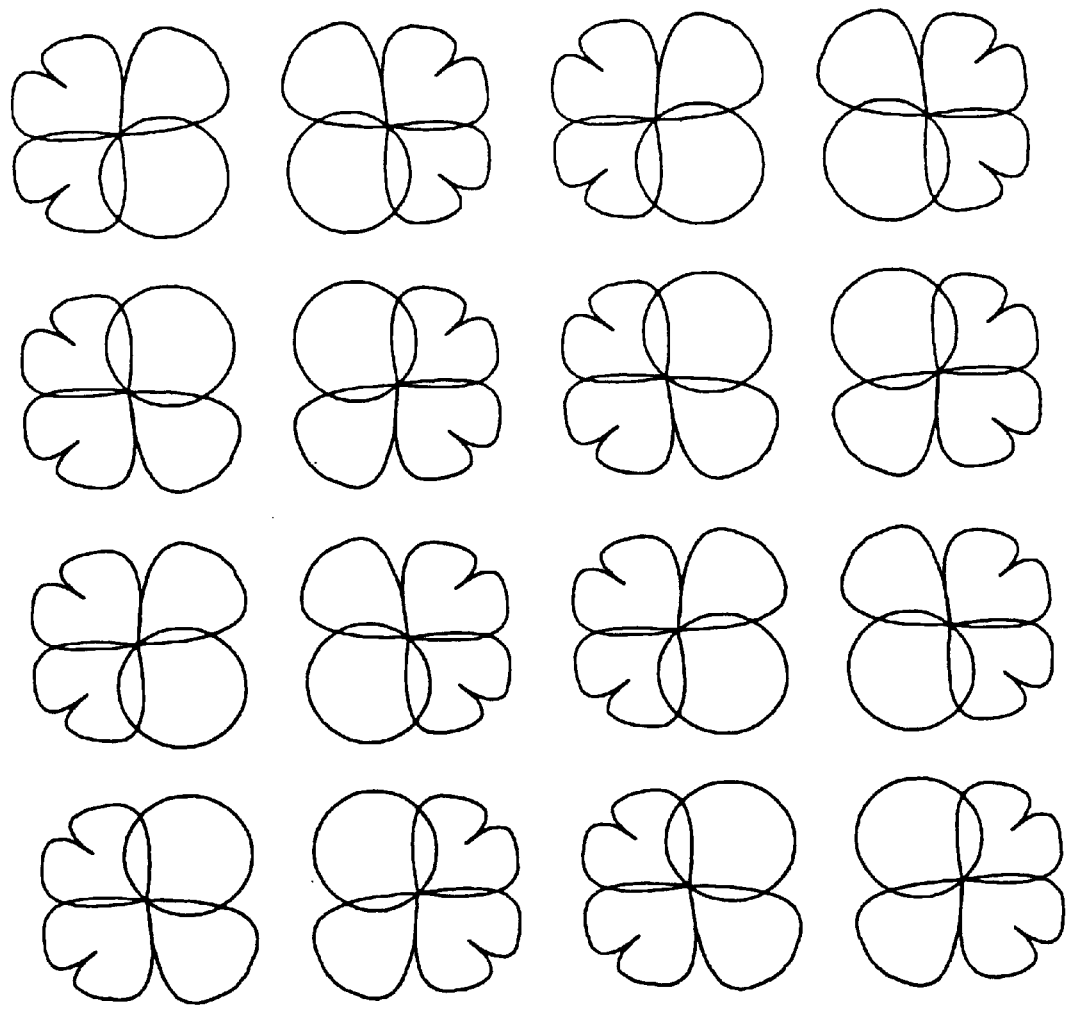
Fig. 11A (Channel 1)

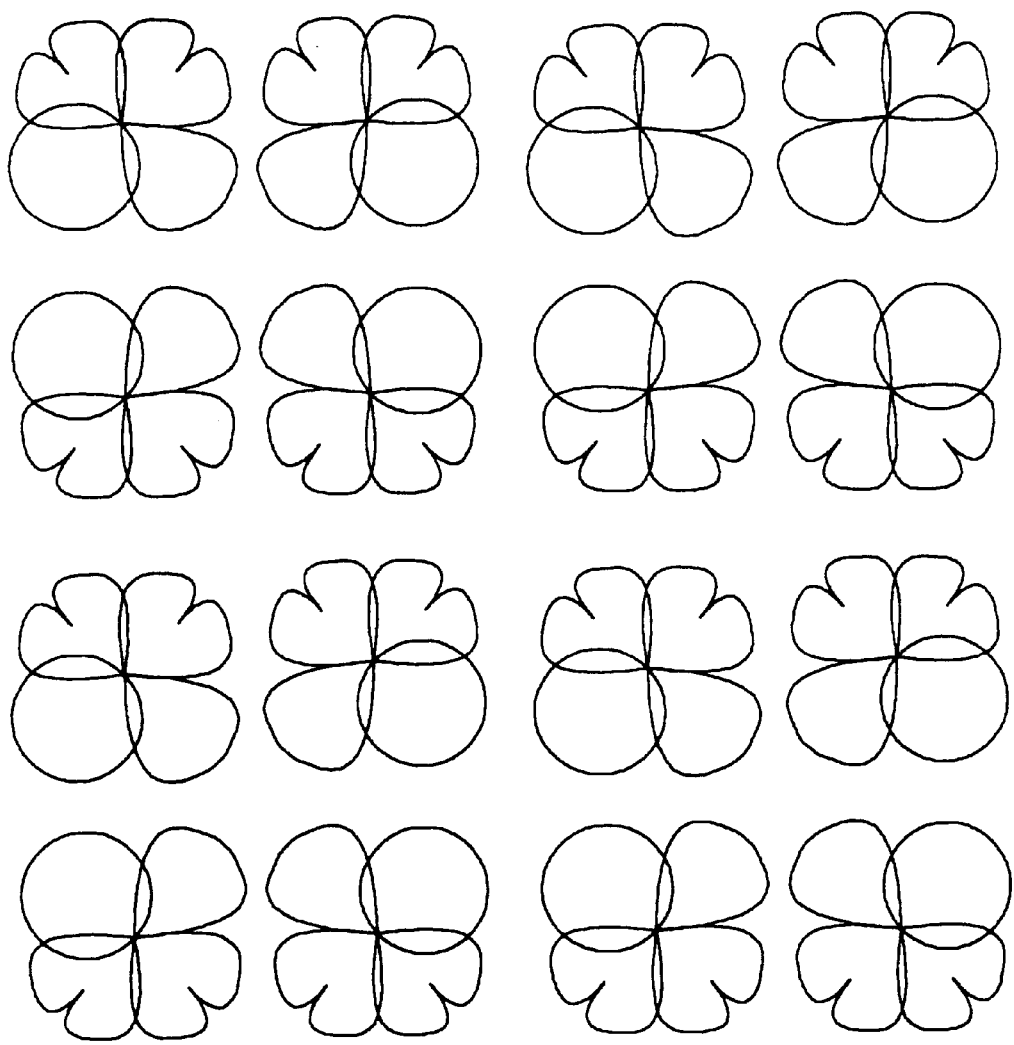
Fig. 11B (Channel 2)

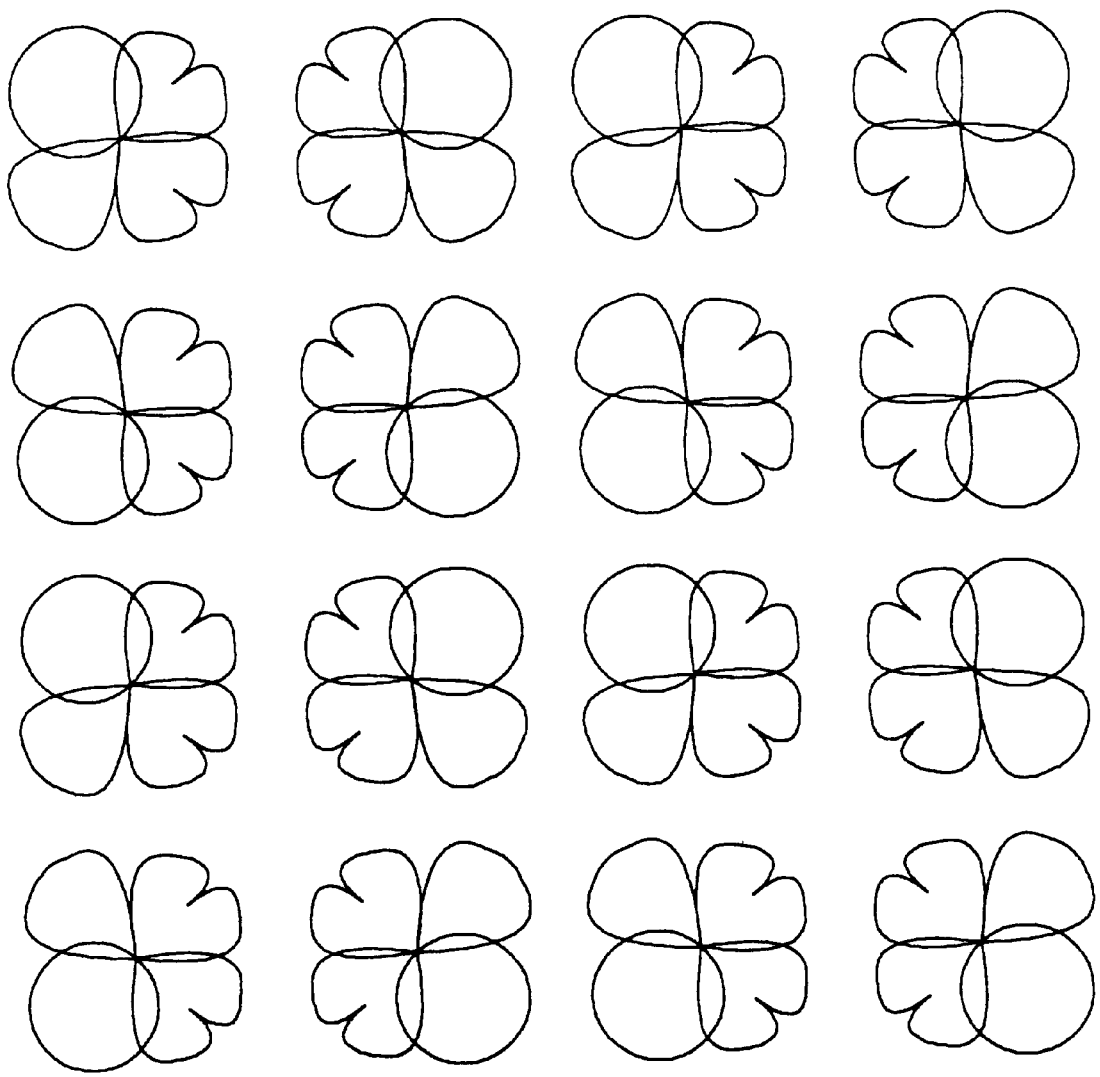
Fig. 11C (Channel 3)

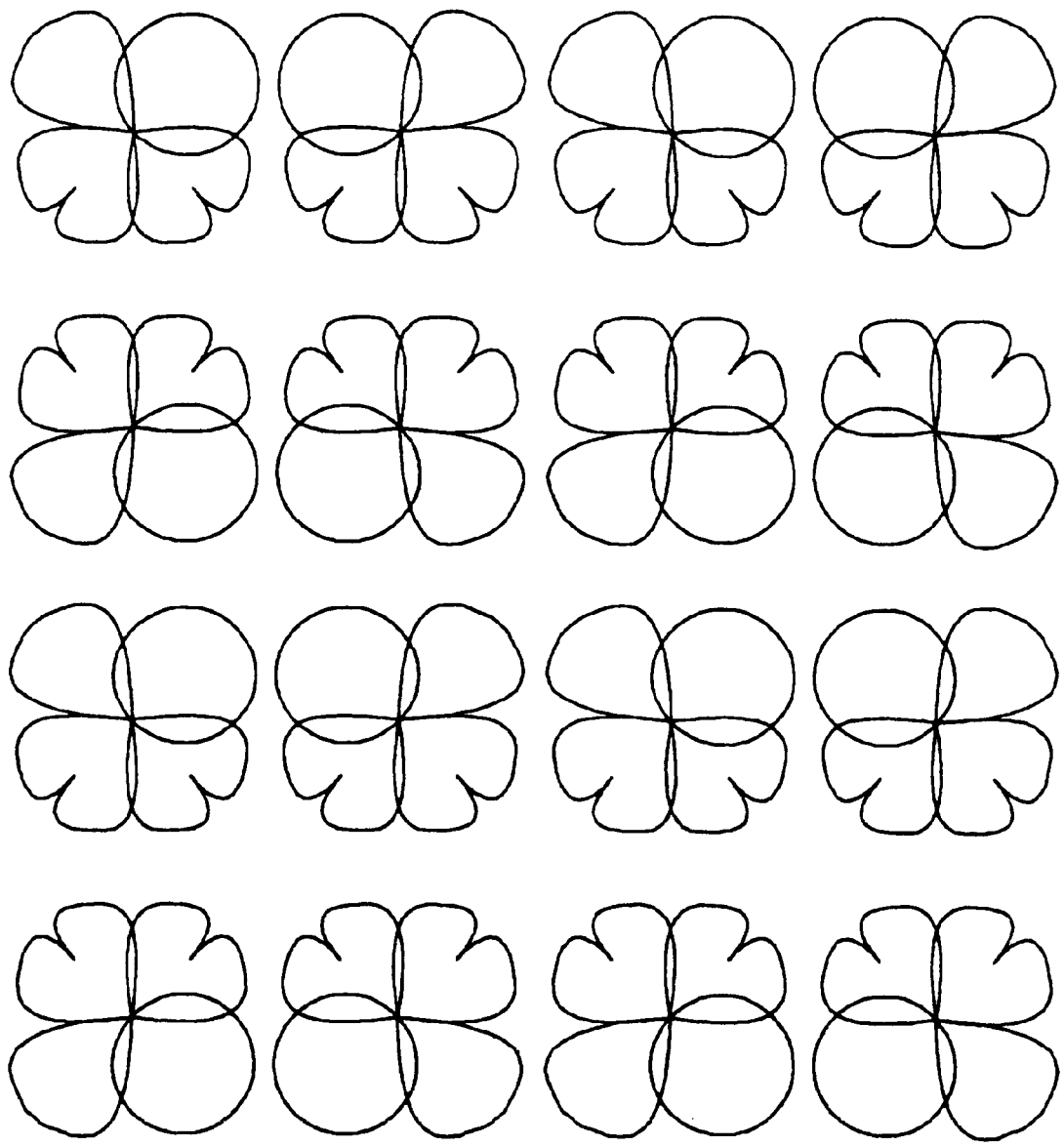
Fig. 11D (Channel 4)

FREQUENCY REUSE SCHEME FOR POINT TO MULTIPOINT RADIO COMMUNICATION

CROSS-REFERENCE TO RELATED APPLICATIONS

This application claims the benefit of U.S. Provisional Application No. 60/103,611 filed Oct. 9, 1998.

FIELD OF THE INVENTION

The invention relates generally to the field of wireless communication systems and more particularly to frequency reuse schemes utilizing base station antennas with notched patterns.

BACKGROUND OF THE INVENTION

A communication system generally includes three components: transmitter, channel, and receiver. The transmitter modulates the signal over the channel. The receiver demodulates the received signal to produce an estimate of the original message. The channel provides a connection between the transmitter and the receiver.

Two types of two-way communication channels exist, namely, point-to point channels and point-to-multipoint channels. Examples of point-to-point channels include wires (e.g., local telephone), microwave links, and optical fibers. Point-to-multipoint channels enable multiple receivers to be reached simultaneously from a single transmitter (e.g. cellular radio telephone communication systems and Local Multipoint Distribution Systems (LMDS)). For broad geographical coverage, a plurality of geographically dispersed transmitters may be employed, each one's coverage area being known as a cell. Directional antennas may be employed at the transmitters, each one covering a portion of a cell known as a sector.

One factor that limits the capacity of a point-to-multipoint radio system is interference from transmitters using the same frequency in different cells, thus restricting the allocation of frequencies However, there are some known frequency reuse schemes which improve the available capacity.

Typically the present state of the art limits reuse of frequencies to N=4 (i.e. each sector operates in a frequency chosen from a predetermined group of four frequencies) for high order modulation schemes. Although reuse schemes have been proposed based on N=2 or N=1, these schemes are in many cases dubious in performance, particularly for high level modulation schemes such as 16 Quadrature Amplitude Modulation (QAM) or 64 QAM, since they typically fail in deployment.

Cellular frequency reuse schemes have been designed and employed with omnidirectional antennas at the terminal equipment and with hexagonal cells. However, in conventional LMDS systems, highly directional antennas are used at the remote terminal equipment with quadratic orientation of base station antennas (i.e. four-sided cells).

FIG. 1A depicts a cell in a conventional LMDS system. A base station 10 is nominally at the center of cell 20. Base station 10 is equipped with four antennas (not shown), each having a nominal 90-degree coverage pattern. The four antennas are aimed 90 degrees apart, thus dividing the cell 20 into four sectors 30. Each of the four antennas operates on a different frequency, each frequency represented by a different orientation of hatching in a sector 30.

FIG. 1B illustrates an LMDS frequency reuse scheme employing a plurality of base stations arrayed on the landscape so as to cover a large area with overlapping cells. The same four frequencies (represented by the four orientations of hatching) are reused a number of times. Some cells use the four frequencies in different positions than the representative cell of FIG. 1A.

An analysis of the scheme illustrated in FIG. 1B shows that with the highly directional antennas at the remote terminal equipment, interference is localized to very narrow zones along the lines connecting multiple base stations. For example, communications to a remote unit located in sector A would be interfered with by base station transmissions in sector B, but not from transmissions from sectors C, D, or E even though sectors C, D, and E operate on the same frequency as sectors A and B. Thus, the interference zones reflect the antenna patterns of the remote terminal equipment.

However, there still exists a need for a better reuse system in LMDS.

There is a need for systems which use base-station antennas that are omnidirectional or "pseudo omnidirectional" (i.e., exhibiting radiation over nearly all, but not entirely all, of 360 degrees.

Accordingly it is an advantage of the present invention to provide an interference-reducing frequency reuse scheme for use with LMDS.

It is another advantage of the present invention to provide a reuse scheme in which Local Multipoint Distribution Systems (LMDS) base stations use omnidirectional or pseudo-omnidirectional base-station antennas with reduced interference.

These and other advantages of the invention will become apparent to those skilled in the art from the following description thereof.

SUMMARY OF THE INVENTION

In accordance with the teachings of the present invention, these and other advantages may be accomplished by the present systems and methods of frequency reuse schemes by employing notched antenna patterns.

In an exemplary embodiment of the invention, the system includes a frequency reuse scheme employing omnidirectional or pseudo-omnidirectional antenna patterns whereby the sector antenna pattern is designed to have directional notches in order to control interference to the surrounding cells.

In another embodiment the system includes a frequency reuse scheme whereby the angular locations of the notches in the antenna pattern are substantially matched to the positions and antenna patterns of the surrounding cells sharing that frequency.

In another embodiment the system includes a frequency reuse scheme whereby orthogonal polarization may be made available for co-channel in-cell repeaters.

In still another embodiment the system includes a frequency reuse scheme whereby the orthogonal polarization may be used for radio backhaul to a central base station from its surrounding base stations (either co-channel, adjacent channel or spread over multiple channels).

In another embodiment of the invention, the system includes a frequency reuse scheme whereby all channels may be used in all cells of a network.

Still another embodiment of the invention includes a frequency reuse scheme whereby all channels may be used in all cells of a network and reused to provide in cell repeaters using either copolar or cross polar polarization (dependent on location of the repeater).

In another embodiment of the invention, the system includes a frequency reuse scheme whereby intercell communication (e.g. backhaul) may be provided using a subset of all channels, the subset being determined by the frequency space patterns of the relevant cell pair.

The invention will next be described in connection with certain exemplary embodiments; however, it should be clear to those skilled in the art that various modifications, additions and subtractions can be made without departing from the spirit or scope of the claims.

BRIEF DESCRIPTION OF THE DRAWINGS

The invention will be more clearly understood by reference to the following detailed description of an exemplary embodiment in conjunction with the accompanying drawings, in which:

FIG. 3A depicts theoretical equivalents of the antenna patterns shown in FIG. 2A;

FIGS. 5A, 5B, 5C and 5D depict an array of rectangular cells having antenna patterns according to the present invention, each Figure showing the patterns allocated to a different frequency;

FIG. 6 depicts antenna patterns for use in hexagonal cells according to the present invention.

FIGS. 7A, 7B, 7C, and 7D depict an array of hexagonal cells having antenna patterns according to the present invention, each showing the patterns allocated to a different frequency;

FIGS. 8A through 8E illustrate propagation directions for backhaul communication on the same frequencies as subscriber communications;

FIGS. 9A, 9B, and 9C depict transmission paths that may be used for backhaul according to the present invention;

FIGS. 11A through 11D each depict the allocation of one frequency channel to the antenna patterns of FIG. 10A.

DETAILED DESCRIPTION OF THE INVENTION

The present invention provides a novel frequency reuse scheme that enables fractional reuse for LMDS type systems using high order modulation (e.g. 4, 16 and 64 QAM). The scheme will be discussed with regard to Quad cell based systems, however those skilled in the art will appreciate that these schemes may also be applicable to hexagonal-cell-based systems and the like. The proposed reuse scheme uses the knowledge that highly directional terminal equipment localizes the interference to very narrow zones along the lines connecting multiple base stations in order to control the interference zones. It employs this knowledge by utilizing omnidirectional base station antennas with notched patterns, or pseudo-omnidirectional antennas formed from multiple directional antennas with or without notches to synthesize omnidirectional antennas with notches (hereinafter any reference to omnidirectional antennas will include pseudo-omnidirectional antennas) to increase capacity of the cell and to control interference from adjacent cells. Those skilled in the art will recognize that while it is preferable that the notch be the inverse function of a remote antenna, practical limitations dictate that the notch is often limited to a crude approximation. The depth of the notches is preferably limited to that necessary for adequate system performance (typically of the order of 10 dB at the remote antenna's 3 dB beamwidth) although it is not required to be so limited. The required notches for each of the reuse frequencies in each cell reside at different angular locations, thus enabling full 360 degree coverage with a varying number of channels available in each direction. Such a scheme as this does not require the use of polarization as an additional discriminator. The orthogonal polarization in this case is available to increase margins in difficult deployments, to provide isolation for in cell repeaters when required or to provide for RF backhaul sharing the same spectrum as the cellular network.

Figure 1A:
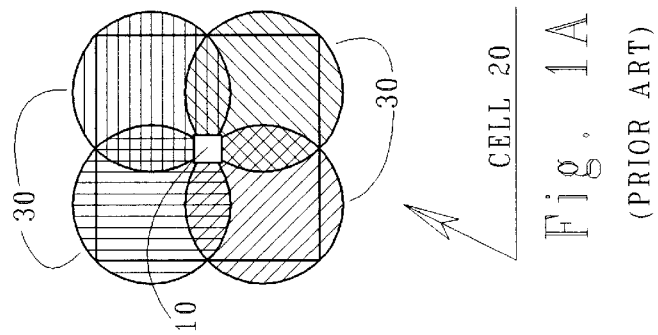
FIG. 1A depicts a cell in a conventional frequency reuse configuration for an LMDS wherein each cell is split into four sectors with each of the four sectors employing a different frequency and a directional base-station antenna.
Figure 1B:
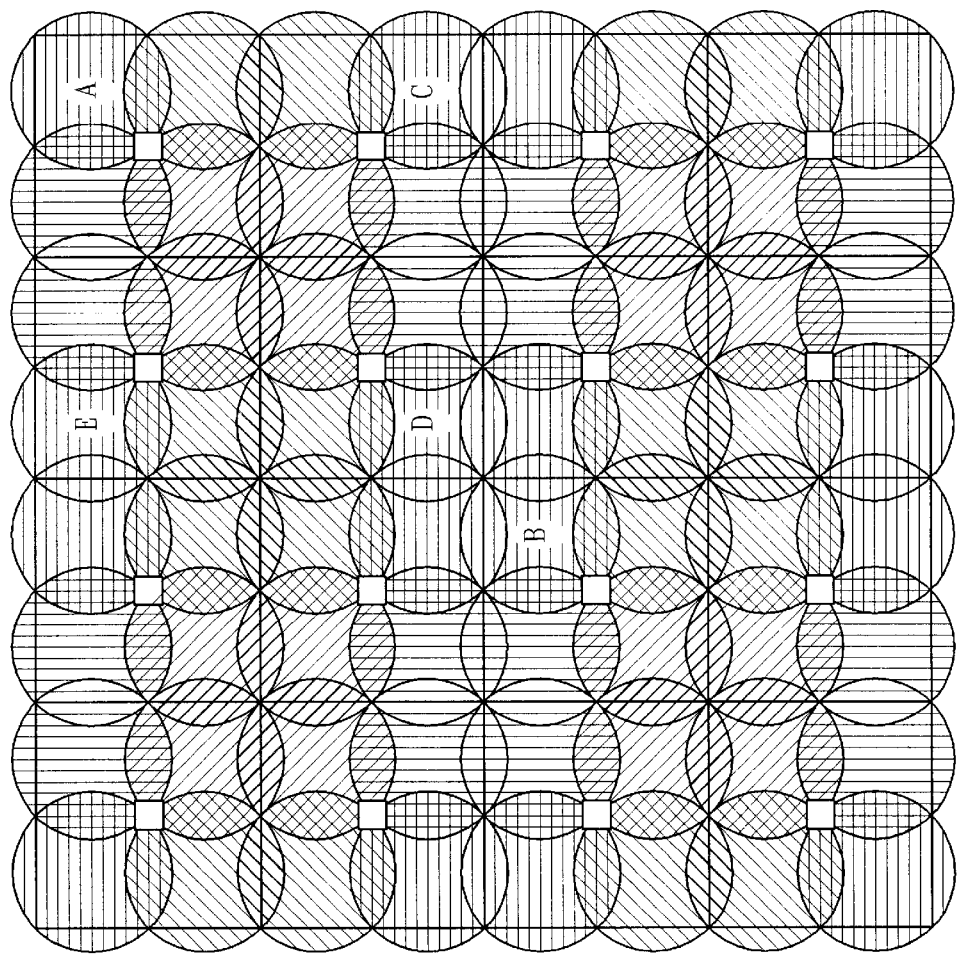
FIG. 1B depicts a conventional frequency reuse configuration deployed in a network comprising a plurality of cells as depicted in FIG. 1A.
Figure 2A:
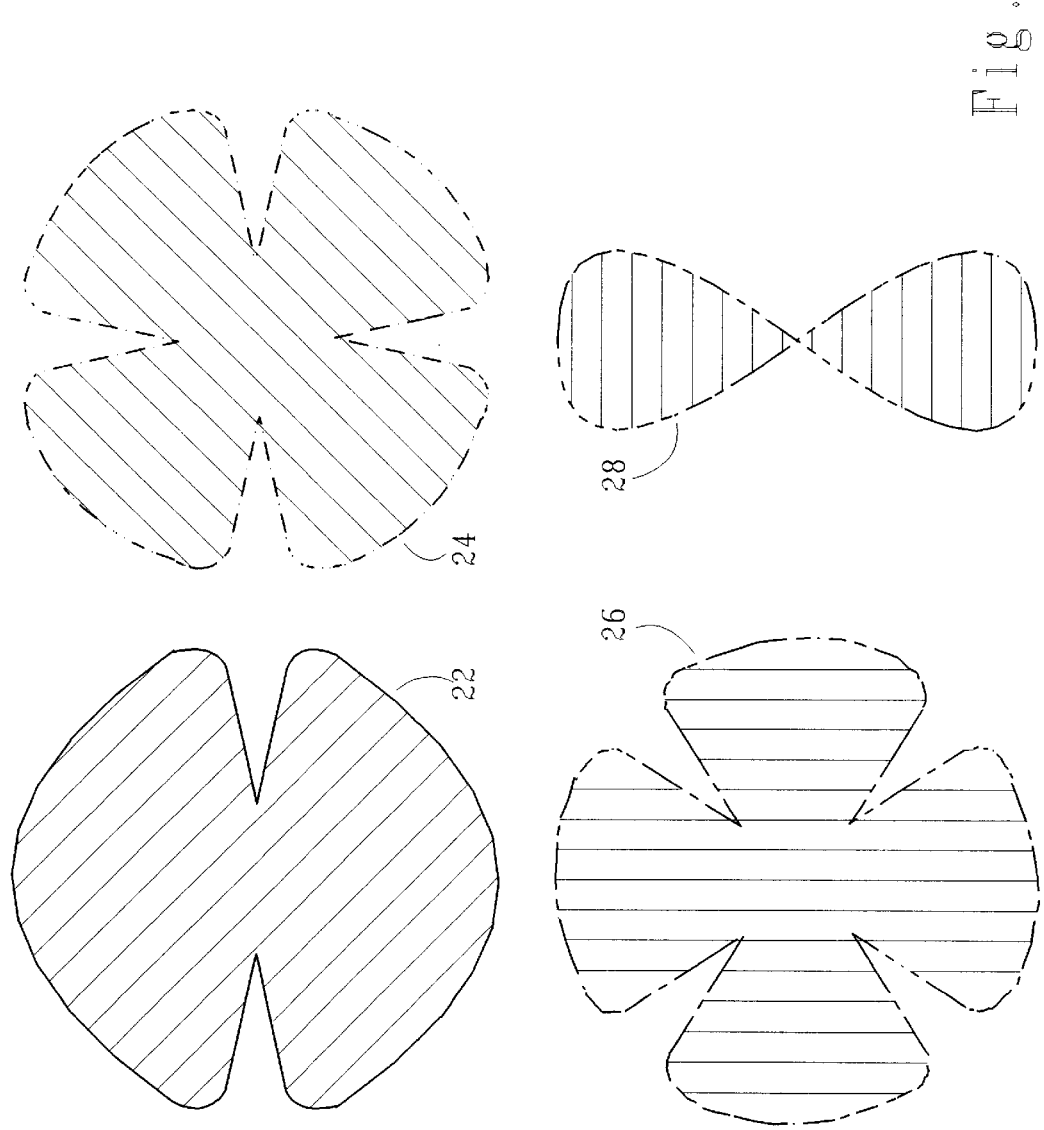
FIG. 2A depicts patterns of several antennas for use on LMDS base stations an accordance with the frequency reuse system of the present invention.
Figure 2B:
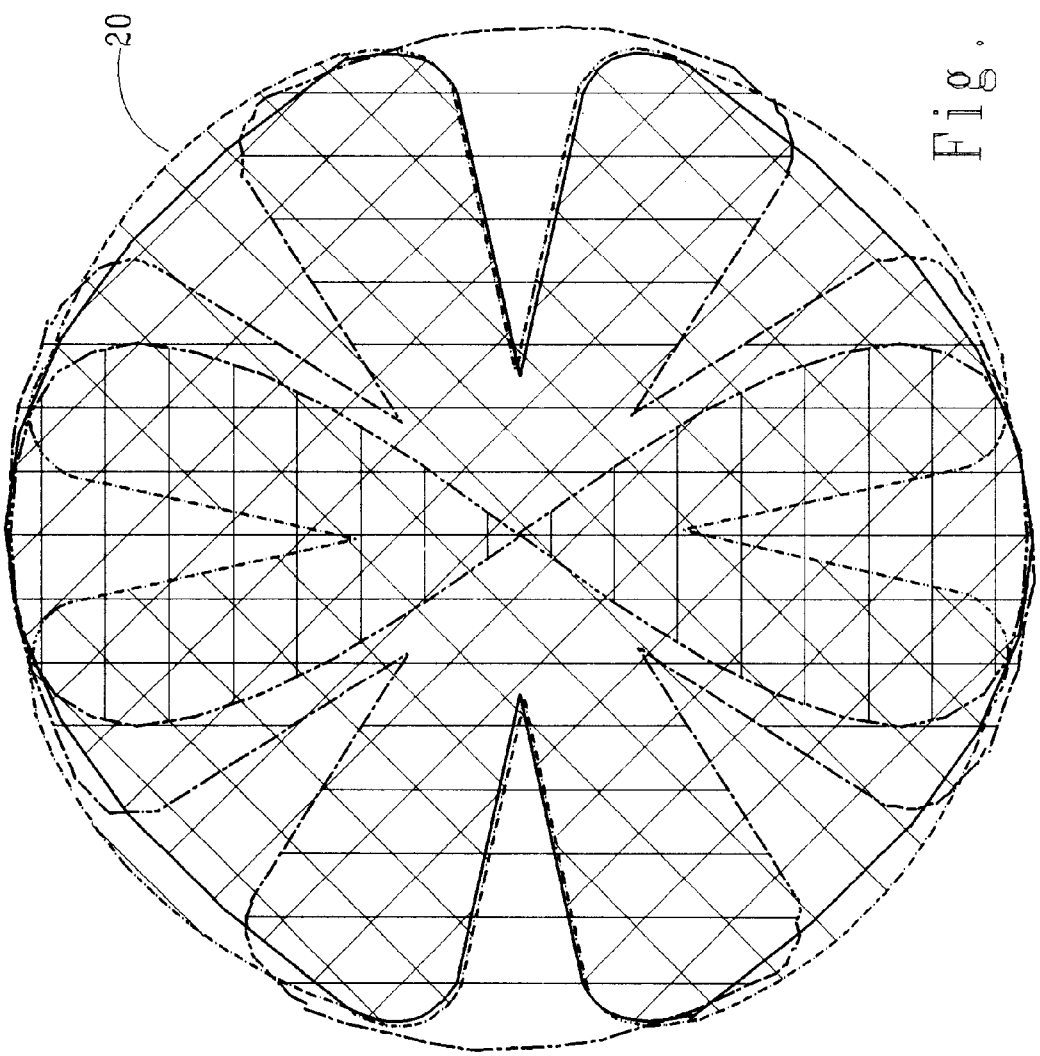
FIG. 2B depicts a composite of the patterns shown in FIG. 2A.

FIG. 2A shows typical radiation patterns 22, 24, and 26 that might be obtained from typical omnidirectional or pseudo-omnidirectional antennas. The patterns exhibit notches. FIG. 2A also shows pattern 28 that might be obtained from a directional antenna that might be used for backhaul communications. Each typically operates in a different frequency range, represented by the different orientations of hatching shown in each of the four patterns 22 through 28. FIG. 2B shows the composite radiation pattern 20 that results in a cell as a result of equipping a single base station with antennas exhibiting the patterns 22 through 28.

Figure 3B:
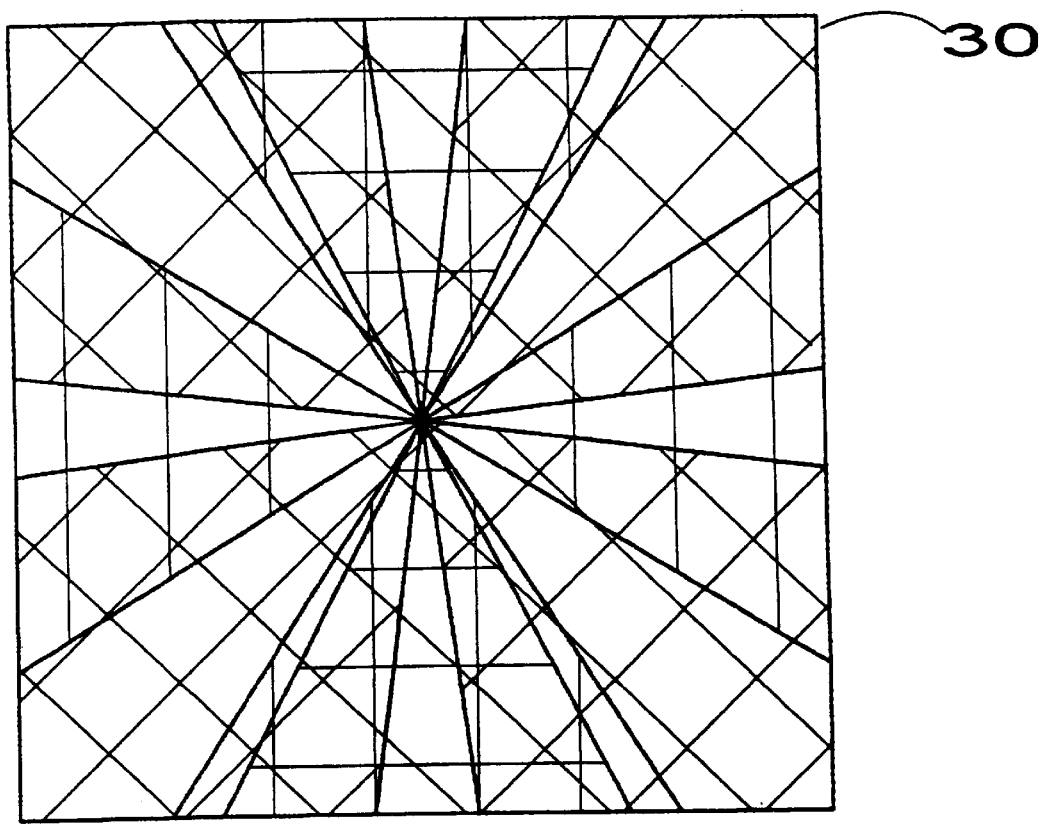
FIG. 3B depicts a composite of the patterns shown in FIG. 3A.

FIG. 3A depicts stylized hypothetical cell radiation patterns 32 through 38 that correspond to actual patterns 22 through 28, respectively, of FIG. 2A. FIG. 3B depicts composite pattern 30, the composite of patterns 32 through 38. To facilitate illustration and discussion, stylized composite pattern 30 of FIG. 3A will be discussed in the ensuing description rather than actual composite pattern 20 of FIG. 2A. Based upon these patterns of FIG. 3A and notches therein, the average coverage for the cell 20 will be 3.2 to 3.3 channels per location within the cell, determined graphically from the patterns of FIG. 3A.

Figure 4:
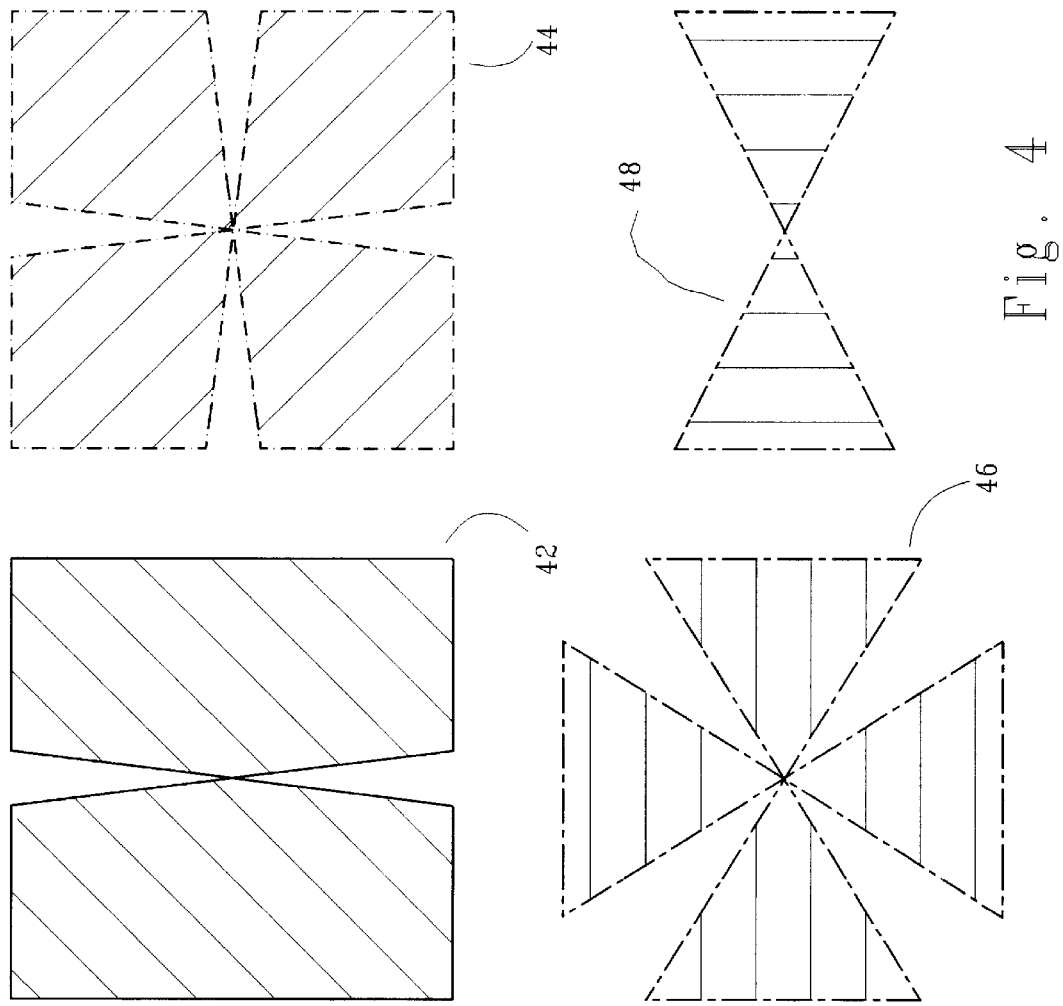
FIG. 4 depicts the patterns of FIG. 3A rotated by ninety degrees.

In an exemplary embodiment, some of the cells employ antenna orientations rotated ninety degrees from those depicted in FIG. 3A. These orientations are shown in FIG. 4, in which elements 42, 44, 46, and 48 are the rotated equivalents of FIG. 3A's elements 32, 34, 36, and 38 respectively.

The purpose and position of the notches is best understood from FIGS. 5A through 5D, which are schematic depictions of a geographically dispersed LMDS system employing four frequencies in each cell, denominated as channels 1, 2, 3, and 4. The FIGS. 5A through 5D each show the patterns to which a different one of the channels is allocated. The patterns from FIGS. 3A and 4 are arranged so that the notches reject interference from the base stations in some of the adjoining cells. The same four frequencies are reused in all the cells.

In FIG. 5B are depicted exemplary remote stations 54, 55, and 56 positioned at the edge of sector 50 and operating in channel 2. The remote stations use highly directional antennas, and the exemplary ones would be aimed at the base station in the center of sector 50. The nearest potentially interfering base station is the one in the center of sector 52. (Other potentially interfering base stations, slightly farther away, are at the centers of sectors 51 and 53.) However, the base station of sector 52 is at least five times as distant from remote station 55 as the base station of sector 50. (If remote station 55 were closer to its base station, the sector 52 base station would be more than five times as distant.) Adjacent sectors do not interfere because of the patterns, notches, and directions thereof. Remote station positions within the same antenna lobe other than the ones shown would be subject to even less interference. The exemplary locations represent worst case.

Other embodiments of communication systems are based on modeling of cells as hexagonal cells. FIG. 6 depicts antenna patterns 61 through 66 for use in hexagonal cells according to the present invention. The patterns 61 through 66 are depicted as being stylized to hexagonal shape, though practical antennas would probably produce patterns with a more circular overall aspect. The patterns 61 through 66 are different orientations of the same basic pattern. Those skilled in the art realize that other patterns than those depicted may be used without departing from the spirit of the invention.

FIGS. 7A, 7B, and 7C depict a geographically dispersed network using hexagonal cells according to the present invention. Each shows a set of antenna patterns for a different one of three frequency channels, denominated as channels 1, 2, and 3. Each base station has a set of three antennas (which may be composite antennas), each producing one of the six patterns 61 through 66 depicted in FIG. 6.

FIG. 7D shows again the configuration of cell patterns for channel 2 given in FIG. 7B and further shows exemplary remote stations 71 through 79 at worst-case locations at the edge of cell 700. Of particular interest are remote stations 72, 75, and 78. Remote station 72, by virtue of having its highly directional antenna aimed at the base station in the center of cell 700, also has its antenna aimed at the base station in adjacent cell 703. The antenna selected for use on channel 2 in cell 703, however, has one of its notches aligned with that communication path. Adjacent-cell interference between cell 703 and remote station 72 is thus eliminated. Analogously, adjacent-cell interference between remote station 75 and cell 78, and between remote station 78 and cell 702, is also eliminated.

The next nearest potentially interfering base stations are in cell 707 (at which remote station 77's antenna is inherently aimed) and cell 709 (at which remote station 73's antenna is inherently aimed). The distance from remote station 77 to the base station of cell 707, however, is more than four times the distance from remote station 77 to its own base station in cell 700, even with remote station 77's worst-case location at the very edge of cell 700. Other potentially interfering base stations are even further away.

FIGS. 8A through 8D illustrate how the present invention enables the use of 1 in 5 cells for backhaul on the same frequency channels that are being used for communication with the mobile cells. Each of these Figures depicts, for 36 cells, the assignment of one of the four frequencies to antenna patterns as discussed above and similarly shown in FIGS. 5A through 5D. Backhaul communication (from one base station to another) is accomplished using antennas separate from those used to communicate with mobile stations. The backhaul antennas have very narrow beams, on the order of three degrees in a preferred embodiment. A beam so narrow can be transmitted through the notches in antenna patterns 46 and 48 of FIG. 4 without causing significant response at any mobile stations located in those notches, since such mobile stations would be communicating with their base stations on one of the other frequencies in which they would not be in a notch relative to their base stations. Using a different polarization for subscriber communications and backhaul communication also helps eliminate interference with subscriber communication. Backhaul communication is not attempted through the notches in antenna patterns 42 or 44 of FIG. 4, since those notches are quite narrow and interference may occur.

Figure 8E:
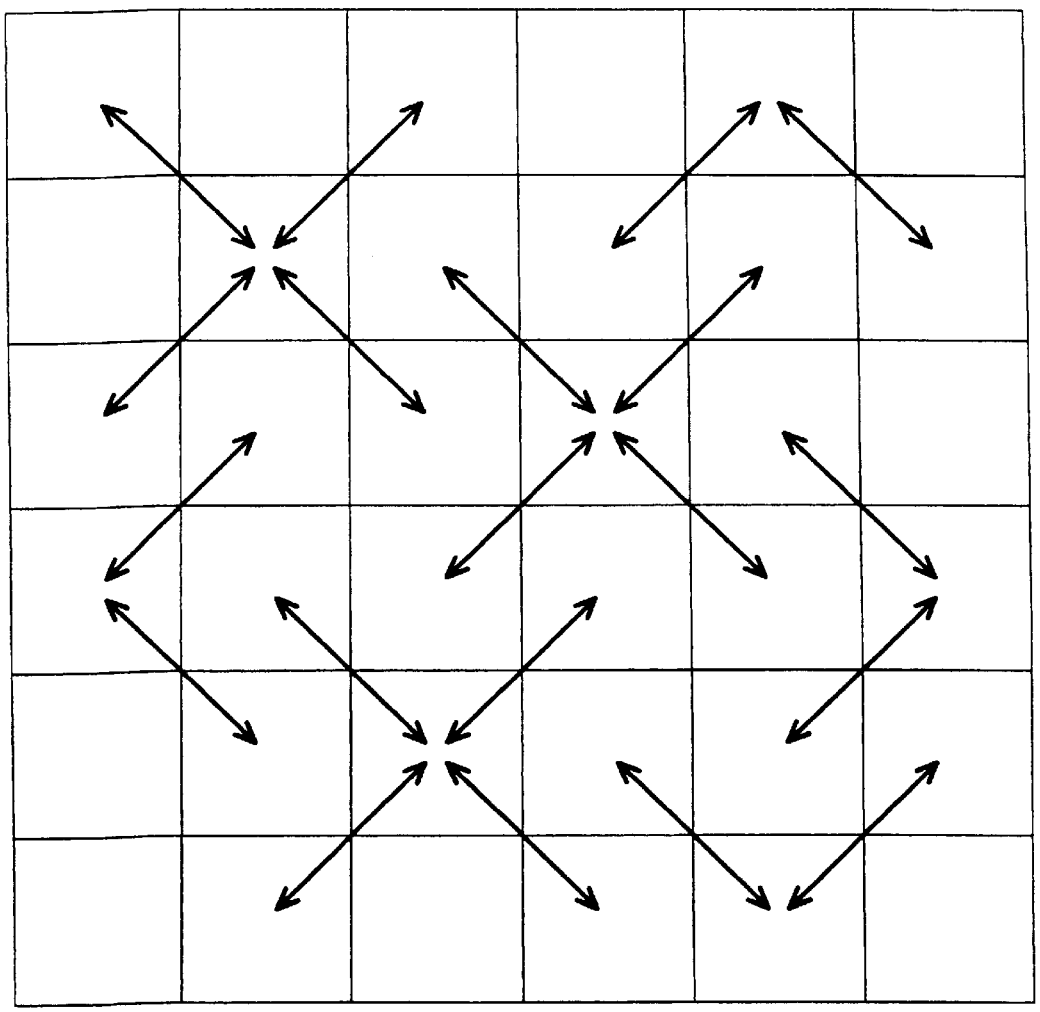

Some paths are susceptible of supporting backhaul transmission on more than one frequency, in which case one frequency is chosen by the designer. FIG. 8E is a composite of the paths among the 36 depicted sectors that are possible according to the present invention using the same frequencies as are used for subscriber communication.

For the 36-cell example of FIGS. 8A through 8D, the number of wired backhauls is reduced from 36 to 15, approximately a 2.5:1 reduction on even a small network such as this. As network size increases the reduction approaches 5:1 asymptotically.

FIGS. 9A, 9B, and 9C show heavy arrowheads connoting transmission paths that may be used for backhaul on channels 1, 2, and 3 respectively. Antennas used for backhaul have very narrow beams. Beamwidths of three degrees or less are preferred. The choice of backhaul paths is so as to direct the narrow backhaul beams through notches that do not carry any customer traffic on a particular channel. Backhaul traffic may thus take place without interfering with subscriber traffic.

Figure 10A:
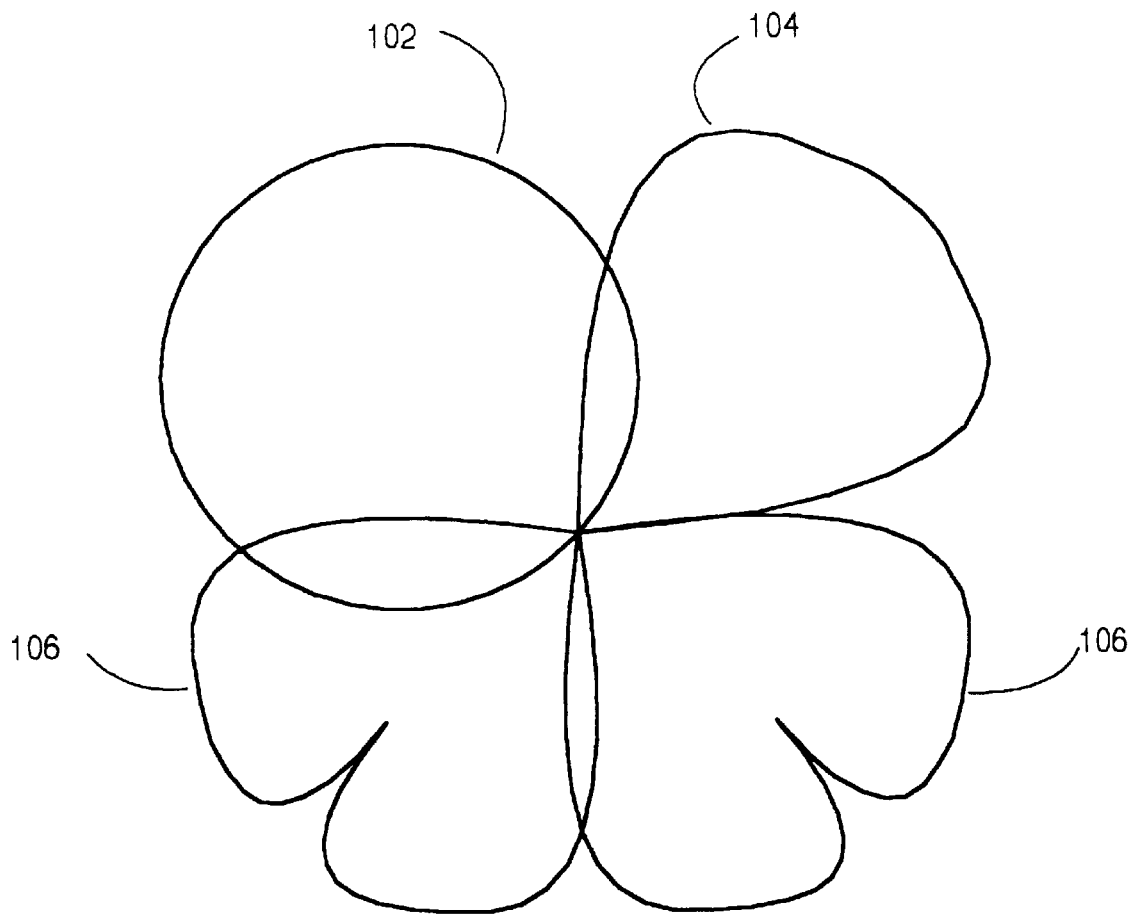
FIG. 10A depicts directional antenna patterns for use in another practice of the invention.
Figure 10B:
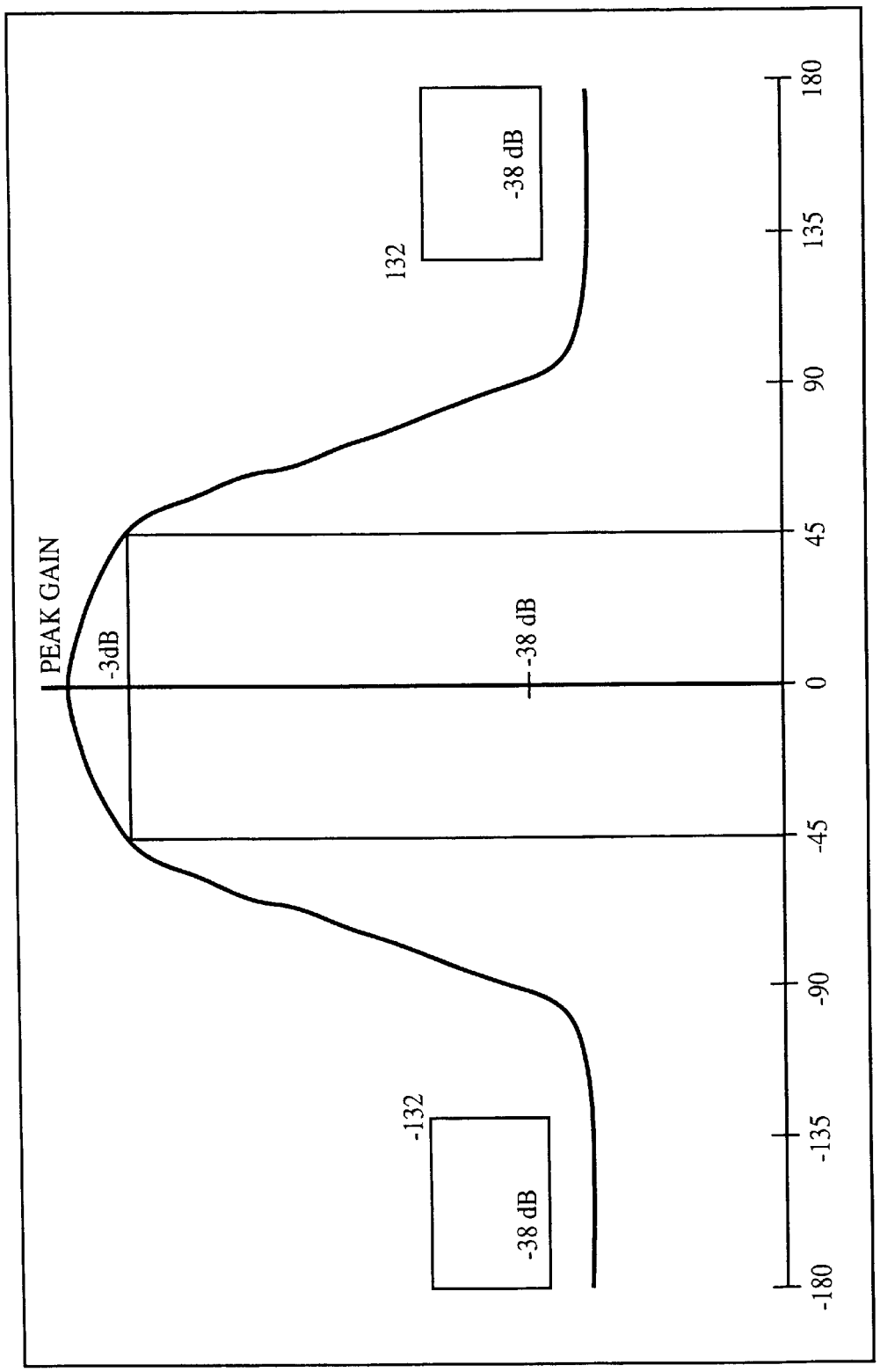
FIGS. 10B through 10D illustrate details of the characteristics of the antenna patterns of FIG. 10A.
Figure 10C:
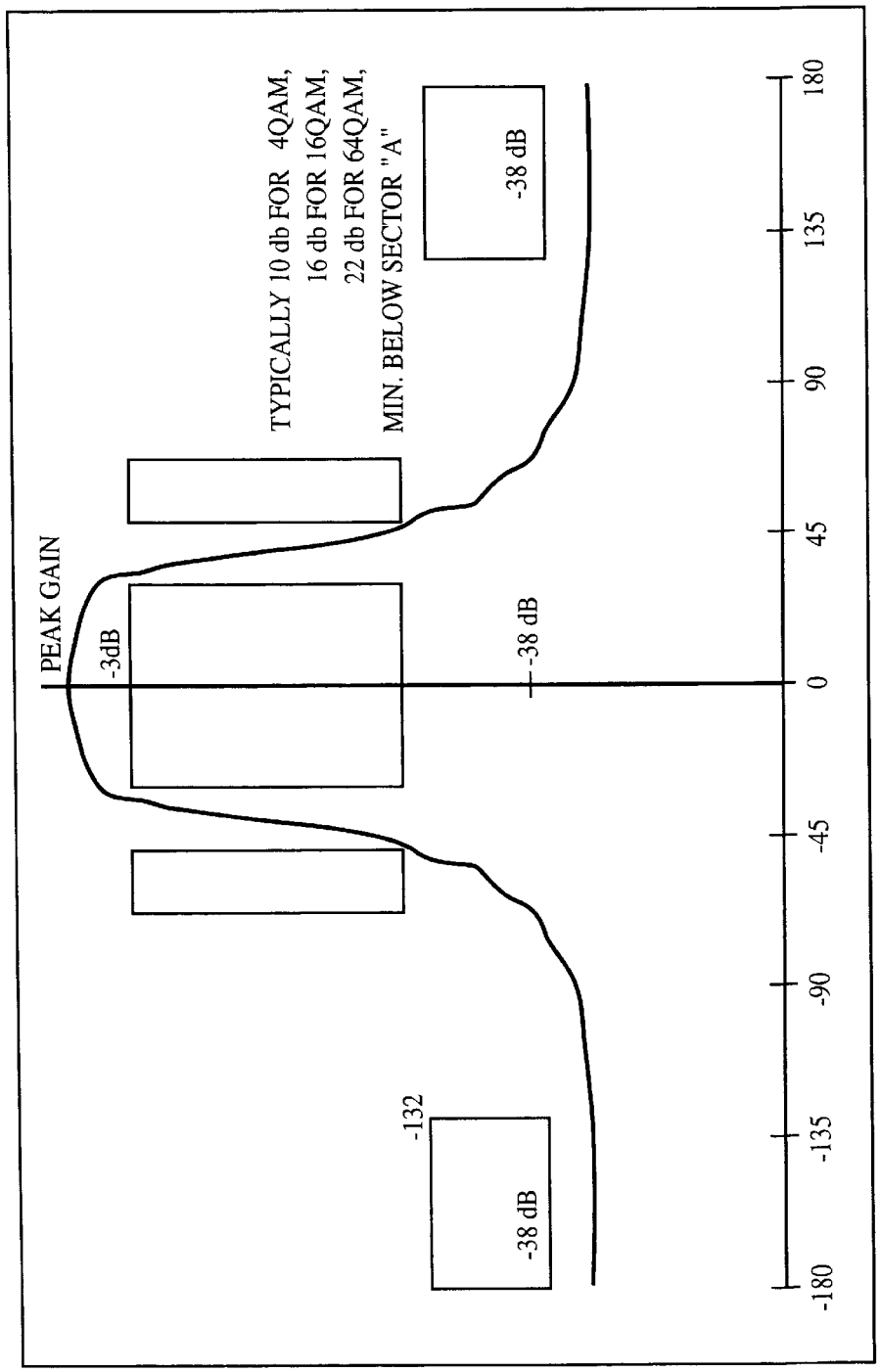
Figure 10D:
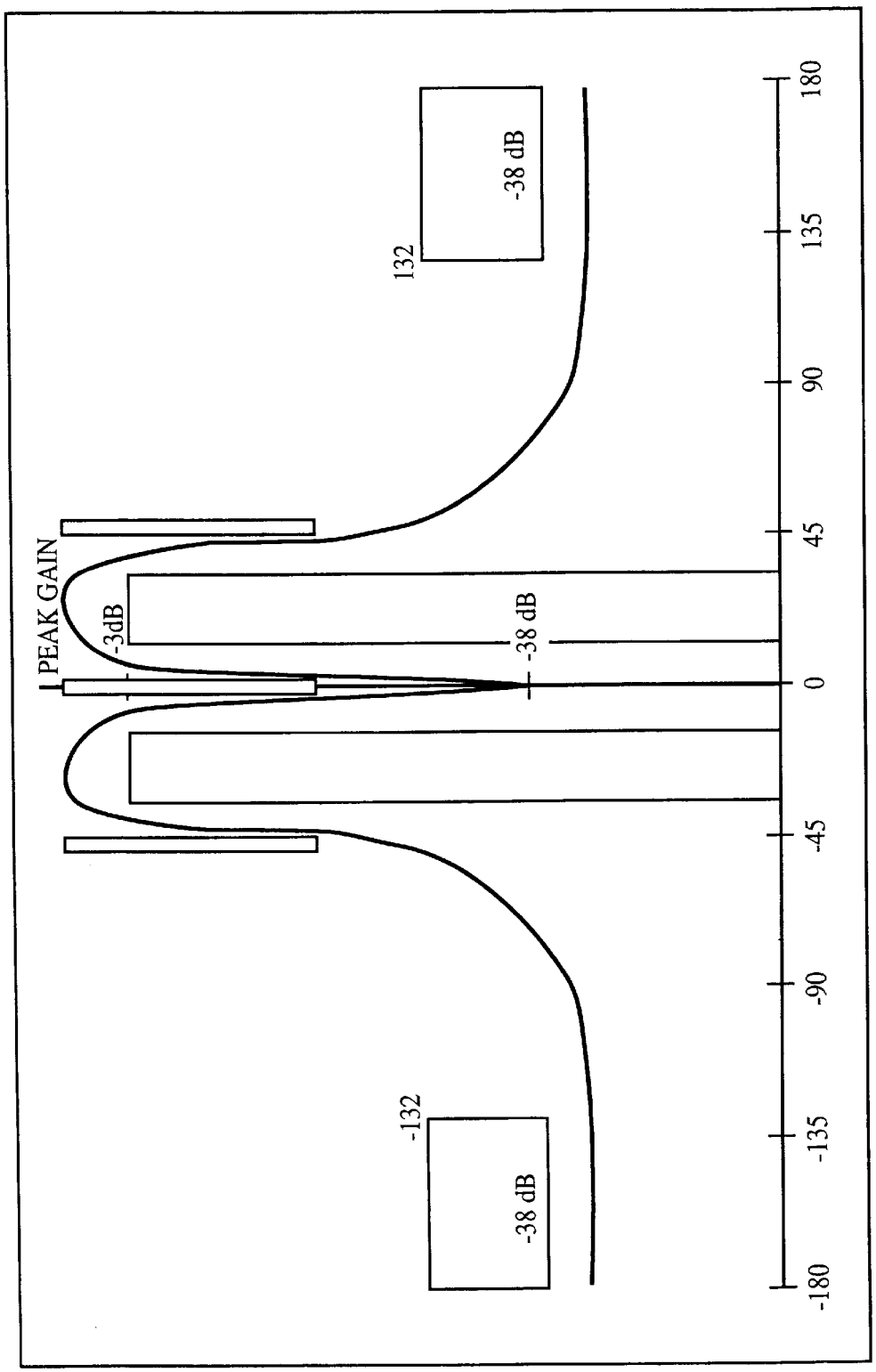

FIG. 10A shows polar plots of antenna patterns 102, 104, and 106 employed in another practice of the invention, with pattern 106 being employed twice. There is thus a total of four patterns, each having a coverage of nominally 90 degrees, with the four patterns being 90 degrees apart. This nominally divides a cell into four equal sectors. FIGS. 10B through 10D are minimum-performance Cartesian plots of the transmission patterns 102, 104, and 106 respectively. The notch depicted in FIG. 10D is 10 db. deep for 4 or 16 QAM modulation and 16 db. deep for 64 QAM modulation. A CPE (Customer Premises Equipment) antenna with a three-degree beamwidth and a typical installation error within plus or minus 1.5 degrees will work with the indicated notches.

FIGS. 11A through 11D show a network comprising cells each deploying the four antenna patterns of FIG. 10A. Each cell on each of the Figures is a mirror image of its neighbors, if the neighbors are considered one at a time. In going from one of the frequency allocations to the next, the patterns in each sector are rotated 90 degrees clockwise.

The systems described will optimally work when the base station spectral power density is constant, and also when the received spectral power density is constant. Those skilled in the art may employ known techniques of power control for achieving these conditions.

It will thus be seen that the invention provides apparatus and methods of frequency reuse schemes in LMDS and similar systems. Those skilled in the art will appreciate that the configurations depicted in FIGS. 2–11 increase capacity of the cells while maintaining an acceptable level of interference from other cells.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A method of reusing a set of frequencies throughout a celluar communication network including a plurality of base stations, comprising:

employing at at least two base stations a plurality of notched antenna patterns whose shapes are determined as an inverse function to transmission patterns of remote stations;

positioning each antenna pattern so that each of its notches is aimed at an adjoining base station;

allocating a different one of said set of frequencies to each antenna pattern of a base station; and transmitting from a base station in a cell to a remote station in said cell on a frequency on which an extension of a path from the base station to the remote station into an adjoining cell passes through a notch of the antenna pattern allocated to the transmitting frequency in said adjoining cell.

2. The method according to claim 1 wherein:

the antenna patterns in any two adjoining cells are substantially the same except for relative angular orientation; and the allocations of frequencies to antenna patterns in any two adjoining cells are entirely different.

3. The method according to claim 1 wherein:

each base station's antenna patterns are positioned so that at least one notch is aimed at each adjoining base station.

4. The method according to claim 1 wherein:

adjoining cells use the same polarization.

5. The method according to claim 1 wherein:

adjoining cells use orthogonal polarizations.

6. The method according to claim 4 wherein:

a cell includes a repeater for transmitting into a portion of a cell; and the base station and the repeater use orthogonal polarizations.

7. The method according to claim 1 wherein:

a base station has one or more additional antenna patterns with narrow beams aimed at base stations of adjoining cells, each transmitting backhaul data to an adjoining cell on a frequency whose antenna pattern has a notch along a path of backhaul transmission.

8. The method according to claim 7 wherein:

backhaul transmission and transmission to a remote station on the same frequency use orthogonal polarization.

9. A method of reusing a set of frequencies throughout a cellular communication network including a plurality of base stations, comprising:

employing at at least two base stations a plurality of antenna patterns each comprising a number N of lobes (where N is a positive integer greater than 1) each lobe having a beamwidth substantially equal to 360/N degrees, the lobes being deployed 360/N degrees apart, one or more of the lobes having a notch whose shapes are determined as an inverse function to transmission patterns of remote stations;

positioning each antenna pattern so that each of its notches is aimed at an adjoining base station;

allocating a different one of said set of frequencies to each antenna pattern of each base station; and transmitting from a base station to a remote station on a frequency on which an extension into an adjoining cell of a path from the base station to the remote station passes through a notch of the antenna pattern allocated to the transmitting frequency in the adjoining cell.

10. The method according to claim 9 wherein:

the antenna patterns in any two adjoining cells are substantially the same except for relative angular orientation; and the allocations of frequencies to antenna patterns in any two adjoining cells are entirely different.

11. The method according to claim 9 wherein:

each base station's antennas are positioned so that at least one notch is aimed at each adjoining base station.

12. The method according to claim 9 wherein:

N is equal to 4.

13. The method according to claim 12 wherein:

the antenna pattern allocated to a frequency in a cell is a mirror image of the antenna patterns allocated to the frequency in each adjoining cell.

14. A cellular communication network including a plurality of base stations, comprising:

at least two base stations having a plurality of notched antenna patterns;

each notch of each antenna pattern aimed at an adjoining base station and having shapes that are determined as an inverse function to transmission patterns of remote stations;

a different one of said set of frequencies allocated to each antenna pattern of a base station; and wherein transmission from a base station in a cell to a remote station in said cell is on a frequency on which an extension of a path from the base station to the remote station into an adjoining cell passes through a notch of the antenna pattern allocated to the transmitting frequency in said adjoining cell.

15. The network according to claim 14 wherein:

the antenna patterns in any two adjoining cells are substantially the same except for relative angular orientation; and the allocations of frequencies to antenna patterns in any two adjoining cells are entirely different.

16. The network according to claim 14 wherein:

each base station's antenna patterns are positioned so that at least one notch is aimed at each adjoining base station.

17. The network according to claim 14 wherein:

adjoining cells use the same polarization.

18. The network according to claim 14 wherein:

adjoining cells use orthogonal polarizations.

19. The network according to claim 17 wherein:

a cell includes a repeater for transmitting into a portion of a cell; and the base station and the repeater use orthogonal polarizations.

20. The network according to claim 14 wherein:

a base station has one or more additional antenna patterns with narrow beams aimed at base stations of adjoining cells, each transmitting backhaul data to an adjoining cell on a frequency whose antenna pattern has a notch along a path of backhaul transmission.

21. The network according to claim 20 wherein:

backhaul transmission and transmission to a remote station on the same frequency use orthogonal polarization.

22. A cellular communication network including a plurality of base stations, comprising:

at least two base stations having a plurality of antenna patterns each comprising a number N of lobes (where N is a positive integer greater than 1) each lobe having a beamwidth substantially equal to 360/N degrees, the lobes being deployed 360/N degrees apart, one or more of the lobes having a notch whose shapes are determined as an inverse function to transmission patterns of remote stations;

each antenna pattern positioned so that each of its notches is aimed at an adjoining base station;

a different one of said set of frequencies allocated to each antenna pattern of a base station; and wherein transmission from a base station in a cell to a remote station in said cell is on a frequency on which an extension into an adjoining cell of a path from the base station to the remote station passes through a notch of the antenna pattern allocated to the transmitting frequency in the adjoining cell.

23. The network according to claim 22 wherein:

the antenna patterns in any two adjoining cells are substantially the same except for relative angular orientation; and the allocations of frequencies to antenna patterns in any two adjoining cells are entirely different.

24. The network according to claim 23 wherein:

each base station's antennas are positioned so that at least one notch is aimed at each adjoining base station.

25. The network according to claim 23 wherein:

N is equal to 4.

26. The network according to claim 25 wherein:

the antenna pattern allocated to a frequency in a cell is a mirror image of the antenna patterns allocated to the frequency in each adjoining cell.

* * * * *